United States Patent
Guo et al.

(10) Patent No.: US 12,531,842 B2
(45) Date of Patent: Jan. 20, 2026

(54) METHOD, APPARATUS AND DEVICE FOR SECURE DATA TRANSMISSION

(71) Applicant: CHINA IWNCOMM CO., LTD., Shaanxi (CN)

(72) Inventors: Jinfa Guo, Shaanxi (CN); Qin Li, Shaanxi (CN); Lulin Fan, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 49 days.

(21) Appl. No.: 18/724,674

(22) PCT Filed: Dec. 20, 2022

(86) PCT No.: PCT/CN2022/140439
§ 371 (c)(1),
(2) Date: Jun. 27, 2024

(87) PCT Pub. No.: WO2023/130952
PCT Pub. Date: Jul. 13, 2023

(65) Prior Publication Data
US 2025/0071099 A1 Feb. 27, 2025

(30) Foreign Application Priority Data
Jan. 5, 2022 (CN) .......................... 202210005672.6

(51) Int. Cl.
*H04L 9/40* (2022.01)
(52) U.S. Cl.
CPC .......... *H04L 63/0435* (2013.01); *H04L 63/06* (2013.01)
(58) Field of Classification Search
CPC ............................ H04L 63/0435; H04L 63/06
See application file for complete search history.

(56) References Cited

U.S. PATENT DOCUMENTS

| 7,818,563 B1 * | 10/2010 | Dwork .................... H04L 63/06 |
| | | 713/151 |
| 9,264,404 B1 * | 2/2016 | Lambert ............... H04L 9/3239 |
| | | (Continued) |

FOREIGN PATENT DOCUMENTS

| CN | 102150392 A | 8/2011 |
| CN | 111555859 A | 8/2020 |
| WO | 2010/026637 A1 | 3/2010 |

OTHER PUBLICATIONS

Extended European Search Report received for European Patent Application No. 22918396.7, mailed on Mar. 20, 2025, 9 pages.

(Continued)

*Primary Examiner* — Darshan I Dhruv
(74) *Attorney, Agent, or Firm* — ArentFox Schiff LLP; Michael Fainberg

(57) ABSTRACT

The present application provides a method, apparatus, and device for secure data transmission. The method comprises: a node 1 incrementally updates an SN1 value, performs first mathematical transformation on the updated SN1 value to calculate an IV1, encrypts a first data packet according to the IV1 and a key, and then sends the encrypted first data packet to a node 2; the node 2 acquires the SN1 value in the first data packet, performs the first mathematical transformation on the acquired SN1 value to calculate the IV1, and decrypts the encrypted first data packet by using the IV1 and the key; the node 2 incrementally updates an SN2 value, performs second mathematical transformation on the updated SN2 value to calculate an IV2, encrypts a second data packet according to the IV2 and the key, and sends the encrypted second data packet to the node 1.

17 Claims, 7 Drawing Sheets

(56) References Cited

U.S. PATENT DOCUMENTS

| | | | |
|---|---|---|---|
| 10,708,246 B1* | 7/2020 | Diamant | H04L 9/0861 |
| 2003/0131233 A1* | 7/2003 | Garstin | H04L 9/12 |
| | | | 713/160 |
| 2009/0113203 A1 | 4/2009 | Tsuge et al. | |
| 2011/0138173 A1* | 6/2011 | Okuda | H04L 9/12 |
| | | | 713/161 |
| 2011/0158410 A1* | 6/2011 | Falk | H04W 12/033 |
| | | | 380/270 |
| 2015/0026470 A1* | 1/2015 | Livolsi | H04L 9/3226 |
| | | | 713/168 |
| 2016/0094523 A1* | 3/2016 | Houghton | H04L 63/0428 |
| | | | 713/150 |
| 2016/0380984 A1* | 12/2016 | Johnson | H04L 63/0485 |
| | | | 713/153 |
| 2020/0053065 A1* | 2/2020 | Wisniewski | H04L 63/06 |

OTHER PUBLICATIONS

Ericsson et al., "Implicit Initialization Vector (IV) for Counter-Based Ciphers in Encapsulating Security Payload (ESP)", Internet Engineering Task Force (IETF), ISSN: 2070-1721, Mar. 2020, 5 pages.

International Search Report and Written Opinion received for PCT Patent Application No. PCT/CN2022/140439, mailed on Feb. 20, 2023, 10 pages (4 pages of English Translation and 6 pages of Original Document).

\* cited by examiner

METHOD, APPARATUS AND DEVICE FOR SECURE DATA TRANSMISSION

CROSS REFERENCE TO RELATED APPLICATION

The present application is a National Stage of International Application No. PCT/CN2022/140439, filed on Dec. 20, 2022, which claims the priority to Chinese Patent Application No. 202210005672.6, filed with China National Intellectual Property Administration on Jan. 5, 2022, which is incorporated in its entirety herein by reference.

TECHNICAL FIELD

The present application relates to the field of network communication, and in particular to a method, apparatus and device for data secure transmission.

BACKGROUND

Internet protocol security (IPSec) provides secure communication between two nodes.
Security association (SA), a basis of the IPSec, refers to a set of policies and keys used to protect communication information. An initialization vector (IV), also known as a starting variable (SV), is an input value having a fixed length, and is usually a random number or pseudorandom number.

In the prior art, when the two nodes of the IPSec are enabled for bidirectional communication, the IV is calculated according to a serial number (SN) carried in a data packet, and encryption/decryption of the data packet is jointly completed by the key and an IV value in the SA. The SA is a unidirectional logical connection. For bidirectional communication between the two nodes, it is necessary to establish a pair of SAs, one of which is used for inbound communication, and the other one of which is used for outbound communication. In view of this, a solution using the unidirectional SA has the defect of consuming system resources.

SUMMARY

The present application provides a method, apparatus and device for data secure transmission, which solve the problem that a solution using a unidirectional security association (SA) consumes system resources in the prior art.

In a first aspect, the present application provides a method for data secure transmission. The method includes: incrementally updating, by a node 1, a serial number $SN_1$ value initialized by the node 1, and performing, by the node 1, first mathematical transformation on an updated $SN_1$ value to calculate a first initialization vector $IV_1$; encrypting, by the node 1, a first data packet according to the calculated $IV_1$ and a key, and then sending, by the node 1, an encrypted first data packet to a node 2; acquiring, by the node 2, the $SN_1$ value in the received first data packet, performing, by the node 2, the first mathematical transformation on the acquired $SN_1$ value to calculate $IV_1$, and decrypting, by the node 2, the encrypted first data packet according to the calculated $IV_1$ and the key; incrementally updating, by the node 2, a serial number $SN_2$ value initialized by the node 2, and performing, by the node 2, second mathematical transformation on an updated $SN_2$ value to calculate a second initialization vector $IV_2$; encrypting, by the node 2, a second data packet according to $IV_2$ and the key, and then sending, by the node 2, an encrypted second data packet to the node 1; and acquiring, by the node 1, the $SN_2$ value in the received second data packet, performing, by the node 1, the second mathematical transformation on the acquired $SN_2$ value to calculate $IV_2$, and decrypting, by the node 1, the encrypted second data packet according to the calculated $IV_2$ and the key; where the first mathematical transformation and the second mathematical transformation cause the calculated $IV_1$ to be unequal to the calculated $IV_2$.

Optionally, before the node 1/node 2 calculates the first initialization vector $IV_1$, the method further includes: determining an overflow sequence of $SN_1$ and $IV_1$; performing the first mathematical transformation on the updated/acquired $SN_1$ value to calculate $IV_1$ when it is determined that $SN_1$ overflows firstly as follows: setting the $SN_1$ value configured to calculate $IV_1$ as a first dynamic parameter, multiplying the first dynamic parameter by a coefficient P, and then summing a product of the first dynamic parameter and the coefficient P, a differentiation parameter C and a first parameter $Q_1$ to calculate $IV_1$; and performing the first mathematical transformation on the updated/acquired $SN_1$ value to calculate $IV_1$ when it is determined that $IV_1$ overflows firstly as follows: dividing the $SN_1$ value configured to calculate $IV_1$ by M for complementation to obtain a third dynamic parameter, multiplying the third dynamic parameter by the coefficient P, and then summing a product of the third dynamic parameter and the coefficient P, the differentiation parameter C and $Q_1$ to calculate $IV_1$; where P is unequal to 1 and 0, and $Q_1$ is 0 or is not an integer multiple of P; and a length of C is equal to a length n of $IV_1$, C includes higher-order bits of k bits and lower-order bits of n−k bits, a value of the lower-order bits is zero, and M is a maximum value $2^{n-k}$ of the lower-order n−k bits of $IV_1$ when $IV_1$ overflows firstly.

Optionally, the determining the overflow sequence of $SN_1$ and $IV_1$ includes: calculating a difference between the length n of $IV_1$ and a length k of the higher-order bits; determining $SN_1$ to overflow firstly under a condition that a length m of $SN_1$ is not greater than the difference; and determining $IV_1$ to overflow firstly under a condition that the length m of $SN_1$ is greater than the difference.

Optionally, before the node 2/node 1 calculates the second initialization vector $IV_2$, the method further includes: determining an overflow sequence of $SN_2$ and $IV_2$; performing the second mathematical transformation on the updated/acquired $SN_2$ value to calculate $IV_2$ when it is determined that $SN_2$ overflows firstly as follows: setting the $SN_2$ value configured to calculate $IV_2$ as a second dynamic parameter, multiplying the second dynamic parameter by the coefficient P, and then summing a product of the second dynamic parameter and the coefficient P, the differentiation parameter C and a second parameter $Q_2$ to calculate $IV_2$; and performing the second mathematical transformation on the updated/acquired $SN_2$ value to calculate $IV_2$ when it is determined that $IV_2$ overflows firstly as follows: dividing the $SN_2$ value configured to calculate $IV_2$ by M for complementation to obtain a fourth dynamic parameter, multiplying the fourth dynamic parameter by the coefficient P, and then summing a product of the fourth dynamic parameter and the coefficient P, the differentiation parameter C and $Q_2$ to calculate $IV_2$; where $Q_2$ is 0 or is not an integer multiple of P, and is different from $Q_1$; and a length of C is equal to a length n of $IV_2$, and M is a maximum value $2^{n-k}$ of lower-order n−k bits of $IV_2$ when $IV_2$ overflows firstly.

Optionally, the determining an overflow sequence of $SN_2$ and $IV_2$ includes: calculating a difference between the length n of $IV_2$ and a length k of the higher-order bits; determining $SN_2$ to overflow firstly under the condition that a length m of $SN_2$ is not greater than the difference; and determining $IV_2$ to overflow firstly under the condition that the length m of $SN_2$ is greater than the difference.

Optionally, before the node 1/node 2 calculates the first initialization vector $IV_1$, the method further includes: starting an updating operation for the key when it is determined that $SN_1$ overflows firstly and the first dynamic parameter reaches a first preset threshold, and using an updated new key as a key used during data sending when the first dynamic parameter reaches a second preset threshold, where the first preset threshold is less than the second preset threshold, and the second preset threshold is not greater than a maximum value of $SN_1$; and starting an updating operation for the key when it is determined that $IV_1$ overflows firstly and the third dynamic parameter reaches a third preset threshold, and using an updated new key as a key used during data sending when the third dynamic parameter reaches a fourth preset threshold, where the third preset threshold is less than the fourth preset threshold, and the fourth preset threshold is not greater than a maximum value of lower-order n–k bits of $IV_1$.

Optionally, before the node 2/node 1 calculates the second initialization vector $IV_2$, the method further includes: starting an updating operation for the key when it is determined that $SN_2$ overflows firstly and the second dynamic parameter reaches a first preset threshold, and using an updated new key as a key used during data sending when the second dynamic parameter reaches a second preset threshold, where the first preset threshold is less than the second preset threshold, and the second preset threshold is not greater than a maximum value of $SN_2$; and starting an updating operation for the key when it is determined that $IV_2$ overflows firstly and the fourth dynamic parameter reaches a third preset threshold, and using an updated new key as a key used during data sending when the fourth dynamic parameter reaches a fourth preset threshold, where the third preset threshold is less than the fourth preset threshold, and the fourth preset threshold is not greater than a maximum value of lower-order n–k bits of $IV_2$.

Optionally, when starting an updating operation for the key, the method further includes: starting a calculation operation of a new value of a number k of bits of the higher-order bits to generate a new differentiation parameter C; or, starting a calculation operation of a new value N of the higher-order bits of the k bits to generate a new differentiation parameter C.

Optionally, when using the updated new key as the key used during data sending, the method further includes: calculating an initialization vector (IV) used during data sending according to the new differentiation parameter C.

Optionally, P is set as 2, $Q_1$ is set as 0, $Q_2$ is set as –1, and C is set as a random number.

In a second aspect, the present application provides an apparatus for data secure transmission. The apparatus includes: a first calculation unit, configured to incrementally update a serial number $SN_1$ value initialized by the apparatus, and perform first mathematical transformation on an updated $SN_1$ value to calculate a first initialization vector $IV_1$; a first encryption unit, configured to encrypt a first data packet according to the calculated $IV_1$ and a key, and then send an encrypted first data packet to a node 2; and a first decryption unit, configured to acquire an $SN_2$ value in a received second data packet, perform second mathematical transformation on the acquired $SN_2$ value to calculate a second initialization vector $IV_2$, and decrypt an encrypted second data packet according to the calculated $IV_2$ and the key; where the first mathematical transformation and the second mathematical transformation cause the calculated $IV_1$ to be unequal to the calculated $IV_2$.

In a third aspect, the present application provides an apparatus for data secure transmission. The apparatus includes: a second decryption unit, configured to acquire an $SN_1$ value in a received first data packet, perform first mathematical transformation on the acquired $SN_1$ value to calculate a first initialization vector $IV_1$, and decrypt an encrypted first data packet according to the calculated $IV_1$ and a key; a second calculation unit, configured to incrementally update a serial number $SN_2$ value initialized by the apparatus, and perform second mathematical transformation on an updated $SN_2$ value to calculate a second initialization vector $IV_2$; a second encryption unit, configured to encrypt a second data packet according to the calculated $IV_2$ and the key, and then send an encrypted second data packet to a node 1, where the first mathematical transformation and the second mathematical transformation cause the calculated $IV_1$ to be unequal to the calculated $IV_2$.

In a fourth aspect, the present application provides a device for data secure transmission. The device includes a memory and a processor, where the memory is configured to store a computer program; and the processor is configured to read the computer program in the memory and execute steps of the method for data secure transmission at a side of a node 1 or node 2 according to the first aspect above.

In a fifth aspect, the present application provides a computer program medium. The computer program medium stores a computer program, where when the computer program is executed by a processor, steps of the method for data secure transmission at a side of a node 1 or node 2 according to the first aspect above is implemented.

The method, apparatus and device for data secure transmission according to the present application have the following beneficial effects.

According to the solution of the present application, for each data interaction between communication nodes, secret communication can be performed according to different initialization vectors (IVs) and the same key, and the same key can be used for inbound communication and outbound communication on the basis of ensuring communication security. That is, only one SA needs to be established and maintained between the communication nodes. However, in the prior art, a pair of SAs need to be established and maintained between communication nodes in order to ensure communication security, one of which is used for inbound communication, and the other one of which is used for outbound communication. That is, the inbound communication uses one key, and the outbound communication uses another different key. When one node communicates with a large number of nodes, the solution of the present application greatly reduces the number of SAs that need to be established and maintained by the nodes, thereby greatly reducing consumption of system resources.

DETAILED DESCRIPTION

The technical solutions in the embodiments of the present application will be clearly and completely described below in combination with the accompanying drawings in the embodiments of the present application. Apparently, the embodiments described are merely some embodiments rather than all embodiments of the present application. On the basis of the embodiments in the present application, all other embodiments obtained by those of ordinary skill in the art without making creative efforts fall within the scope of protection of the present application.

It should be noted that the terms "first", "second", etc. in the description and claims of the present application and in the accompanying drawings described above, are used to distinguish similar objects, and not necessarily to describe a particular order or sequential order. It should be understood that the data used in this way can be interchanged where appropriate, such that the embodiments of the present application described herein can be implemented in other sequences than those illustrated or described herein.

The implementations described in the following exemplary embodiments do not denote all implementations consistent with the present application. On the contrary, the implementations are merely examples of a device and a method consistent with some aspects of the present application as detailed in the appended claims. On the basis of the embodiments in the present application, all other embodiments obtained by those of ordinary skill in the art without making creative efforts fall within the scope of protection of the present application.

In the description of the embodiments of the present application, unless otherwise specified, "/" represents or. For example, A/B may represent A or B. In addition, in the description of the embodiments of the present application, "plurality" refers to two or more, and other quantifiers are similar thereto. It should be understood that the preferred embodiments described herein are only used for describing and explaining the present application but are not intended to limit the present application, and the embodiments of the present application and features in the embodiments can be combined with each other without conflict.

In view of the problem that the solution using a unidirectional security association (SA) consumes system resources in the prior art, the present application provides a method, apparatus and device for data secure transmission.

The method, apparatus and device for data secure transmission in the embodiments of the present application will be described below in combination with the accompanying drawings.

Figure 1:
FIG. 1 is a schematic diagram of an application scenario of data secure transmission according to an embodiment of the present application.

As shown in FIG. 1, a schematic diagram of an application scenario of data secure transmission is provided in an embodiment of the present application, including: a node 1, configured to incrementally update a serial number $SN_1$ value initialized by the node 1, and perform first mathematical transformation on an updated $SN_1$ value to calculate a first initialization vector $IV_1$; encrypt a first data packet according to the calculated $IV_1$ and a key, and then send an encrypted first data packet to a node 2; and acquire an $SN_2$ value in a received second data packet, perform second mathematical transformation on the acquired $SN_2$ value to calculate a second initialization vector $IV_2$, and decrypt an encrypted second data packet according to the calculated $IV_2$ and the key; and the node 2, configured to acquire an $SN_1$ value in the received first data packet, perform the first mathematical transformation on the acquired $SN_1$ value to calculate $IV_1$, and decrypt the encrypted first data packet according to the calculated $IV_1$ and the key; incrementally update a serial number $SN_2$ value initialized by the node 2, and perform second mathematical transformation on an updated $SN_2$ value to calculate a second initialization vector $IV_2$; and encrypt a second data packet according to the calculated $IV_2$ and the key, and then send an encrypted second data packet to the node 1.

The encrypted first data packet at least includes an $SN_1$ value field and an encrypted data field. The encrypted second data packet at least includes an $SN_2$ value field and an encrypted data field. The first mathematical transformation and the second mathematical transformation cause the calculated $IV_1$ to be unequal to the calculated $IV_2$.

It should be noted that both communication parties are represented by the node 1 and the node 2. When secure communication is provided between the two nodes, the node 1 may be a local requester (which is abbreviated as a local REQ) or a peer responder (which is abbreviated as a peer REP). When the node 1 acts as the local REQ, the node 2 is the peer REP. When the node 1 acts as the peer REP, the node 2 is the local REQ.

The node 1 and the node 2 may be network devices in any form, such as routers, gateways, switches, network bridges, wireless access points, base stations, firewalls, modems, hubs, network interface controllers (NICs), reverse proxy, servers (e.g., proxy servers), multiplexers, security devices, intrusion detection devices, load balancers and similar devices, etc.; or may also be cellular networks, local area networks (LANs), core networks, access networks, wide area networks (WANs) such as Internet, cloud networks, etc., which are not limited in the embodiment of the present application.

Communication between the node 1 and the node 2 may include data secure transmission having an encapsulation format or data secure transmission having no encapsulation format.

Figure 2:
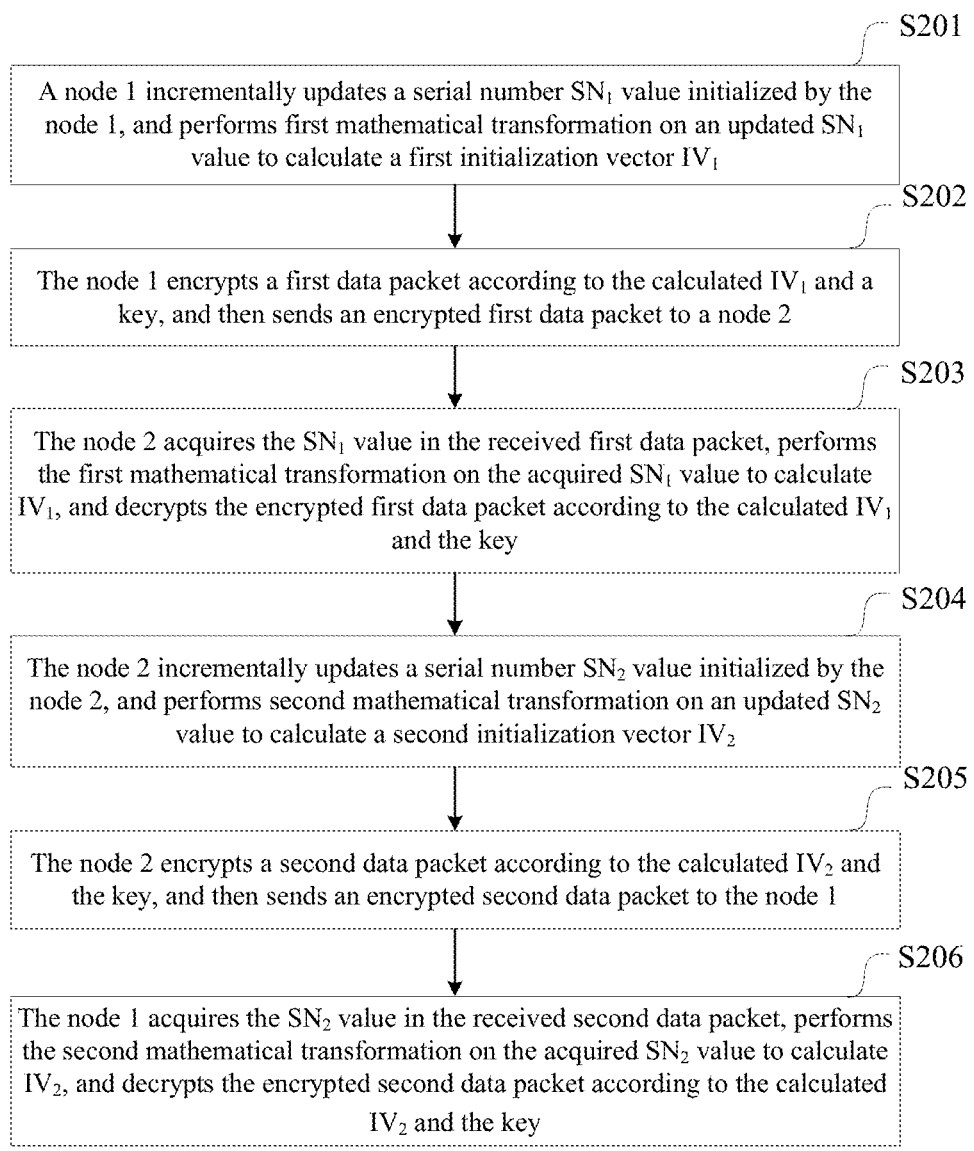
FIG. 2 is a flow chart of a method for data secure transmission according to an embodiment of the present application.

As shown in FIG. 2, a flow chart of a method for data secure transmission is provided in an embodiment of the present application. The method includes the following.

S201, a node 1 incrementally updates a serial number $SN_1$ value initialized by the node 1, and performs first mathematical transformation on an updated $SN_1$ value to calculate a first initialization vector $IV_1$.

The meaning that the node 1 incrementally updates the serial number $SN_1$ value initialized by the node 1 is as follows: after the node 1 initializes the $SN_1$ value, the node 1 incrementally updates the $SN_1$ value initialized; and the node 1 incrementally updates the $SN_1$ value used last time when calculating $IV_1$ next time.

A value from which the $SN_1$ value starts, and a specific form of incremental updating of the $SN_1$ value are not limited in the embodiment of the present application. As an optional implementation, the $SN_1$ value starts from 1 and is incrementally updated by adding 1 each time.

An initial value of $SN_1$ is not limited in the embodiment of the present application, and the initial value of $SN_1$ may be extremely large. In an extreme case, the initial value of $SN_1$ is a set key updating critical value. The extreme case is within the scope of protection of the embodiment of the present application.

S202, the node 1 encrypts a first data packet according to the calculated $IV_1$ and a key, and then sends an encrypted first data packet to a node 2.

By using the calculated $IV_1$ and the key as two input parameters of an encryption algorithm used, the first data packet is encrypted according to the encryption algorithm used, and then an encrypted first data packet is sent to the node 2. The encrypting the first data packet includes: encrypting effective loads in the first data packet. The encrypted first data packet at least includes an $SN_1$ value field and an encrypted data field.

S203, the node 2 acquires the $SN_1$ value in the received first data packet, performs the first mathematical transformation on the acquired $SN_1$ value to calculate $IV_1$, and decrypts the encrypted first data packet according to the calculated $IV_1$ and the key.

The node 2 receives the encrypted first data packet sent by the node 1, acquires an $SN_1$ value in the encrypted first data packet, and then performs the first mathematical transformation on the acquired $SN_1$ value to calculate $IV_1$. Since bidirectional SA is used during communication between the node 1 and the node 2 in the present application, both communication parties only need to establish one SA (the SA includes the key in the embodiment of the present application). Thus, the node 2 may decrypt, by using the calculated $IV_1$ and the key as two input parameters of the encryption algorithm used, the encrypted first data packet by using the encryption algorithm used.

S204, the node 2 incrementally updates a serial number $SN_2$ value initialized by the node 2, and performs second mathematical transformation on an updated $SN_2$ value to calculate a second initialization vector $IV_2$.

The meaning that the node 2 incrementally updates the serial number $SN_2$ value initialized by the node 2 is as follows: after the node 2 initializes the $SN_2$ value, the node 2 incrementally updates the $SN_2$ value initialized; and the node 2 incrementally updates the $SN_2$ value used last time when calculating $IV_2$ next time.

A value from which $SN_2$ starts, and a specific form of incremental updating of the $SN_2$ value are not limited in the embodiment of the present application. As an optional implementation, the $SN_2$ value starts from 1 and is incrementally updated by adding 1 each time.

An initial value of $SN_2$ is not limited in the embodiment of the present application, and the initial value of $SN_2$ may be extremely large. In an extreme case, the initial value of $SN_2$ is a set key updating critical value. The extreme case is within the scope of protection of the embodiment of the present application.

It should be noted that the initial value of $SN_2$ may be the same as or different from the initial value of $SN_1$, and the specific form of incremental updating of $SN_2$ may be the same as or different from the specific form of incremental updating of $SN_1$.

The first mathematical transformation and the second mathematical transformation cause the calculated $IV_1$ to be unequal to the calculated $IV_2$.

S205, the node 2 encrypts a second data packet according to the calculated $IV_2$ and the key, and then sends an encrypted second data packet to the node 1.

By using the calculated $IV_2$ and the key as two input parameters of an encryption algorithm used, the second data packet is encrypted according to the encryption algorithm used, and then an encrypted second data packet is sent to the node 1. The encrypting the second data packet includes: encrypting effective loads in the second data packet. The encrypted second data packet at least includes an $SN_2$ value field and an encrypted data field.

S206, the node 1 acquires the $SN_2$ value in the received second data packet, performs the second mathematical transformation on the acquired $SN_2$ value to calculate $IV_2$, and decrypts the encrypted second data packet according to the calculated $IV_2$ and the key.

The node 1 receives the encrypted second data packet sent by the node 2, acquires the $SN_2$ value in the encrypted second data packet, then performs the second mathematical transformation on the acquired $SN_2$ value to calculate $IV_2$, and decrypts, by using the calculated $IV_2$ and the key as two input parameters of the encryption algorithm used, the encrypted second data packet by using the encryption algorithm used.

It should be noted that the first mathematical transformation and the second mathematical transformation are pre-shared between the node 1 and the node 2 in each embodiment of the present application. Moreover, SA consists of a plurality of security association parameters (SAPs). The SAPs include a key parameter. The key parameter is negotiated between the node 1 and the node 2 during establishment of the SA. That is, the key is also pre-shared between the node 1 and the node 2 in each embodiment of the present application.

In the embodiment of the present application, the length of the serial number $SN_1$ initialized by the node 1 is equal to the length of the serial number $SN_2$ initialized by the node 2. The length of the first initialization vector $IV_1$ calculated by the node 1 is equal to the length of the second initialization vector $IV_2$ calculated by the node 2.

With continuous improvement of computer performance, calculation power of a computer has been rapidly increased. A 64-bit counter, such as an electronic serial number (ESN) of Internet protocol security (IPsec), can quickly overflow in an ultra-high-speed device, and a system will cycle the counter continuously, thereby affecting system performance. In some environments, such as Internet of Things (IOT), the requirements for the counter are not high. A 16-bit counter can satisfy the requirements. However, at least 32-bit SN is to be transmitted in each sent message of the IPsec. Such a design will waste a bandwidth in an environment of receiving and sending rare packets. Thus, in order to be adapted to different application scenarios, an adjustable counter is needed.

Thus, the solution of setting lengths of an $SN_1$ and an $SN_2$ according to specific implementation conditions is provided in an embodiment of the present application. The length of both $SN_1$ and $SN_2$ may be determined to be m bits according to an application scenario between the node 1 and the node 2. A longer serial number length is set under the condition of high requirements for the counter, so as to solve the problem that the counter overflows quickly in an ultra-high-speed environment. A shorter serial number length is set under the condition of low requirements for the counter, so as to reduce bandwidth traffic, improve bandwidth utilization, and satisfy the requirements for working in some low traffic environments.

For example, in the low traffic environment, the length of both $SN_1$ and $SN_2$ is set to 8 bits, and may save 24 bits of bandwidth and traffic compared with $SN_1$ and $SN_2$ having a length of 32 bits.

During data secure communication, both communication parties can obtain SN values from each other.

According to the encryption algorithm used, the length of both $IV_1$ and $IV_2$ is determined to be n bits between the node 1 and the node 2. The length of $IV_1$ and $IV_2$ is determined according to the encryption algorithm used by both communication parties during data secure communication. For example, when the encryption algorithm used by the node 1 and the node 2 is SM4-GCM-128, an IV length is 128 bits. When the encryption algorithm used by the node 1 and the node 2 is AES-GCM-256, the IV length is 256 bits. When the encryption algorithm used by the node 1 and the node 2 is AES-CBC-128, the IV length is 128 bits.

It should be noted that the encryption algorithm may be selected according to specific implementation scenarios, which is not limited in the embodiment of the present application.

As an optional implementation, the encryption algorithm is a symmetric encryption algorithm.

It should be noted that the length m of $SN_1$ and $SN_2$, and the length n of $IV_1$ and $IV_2$ can be determined by either the node 1 or the node 2, or jointly determined by the node 1 and the node 2.

Figures 3, 4:
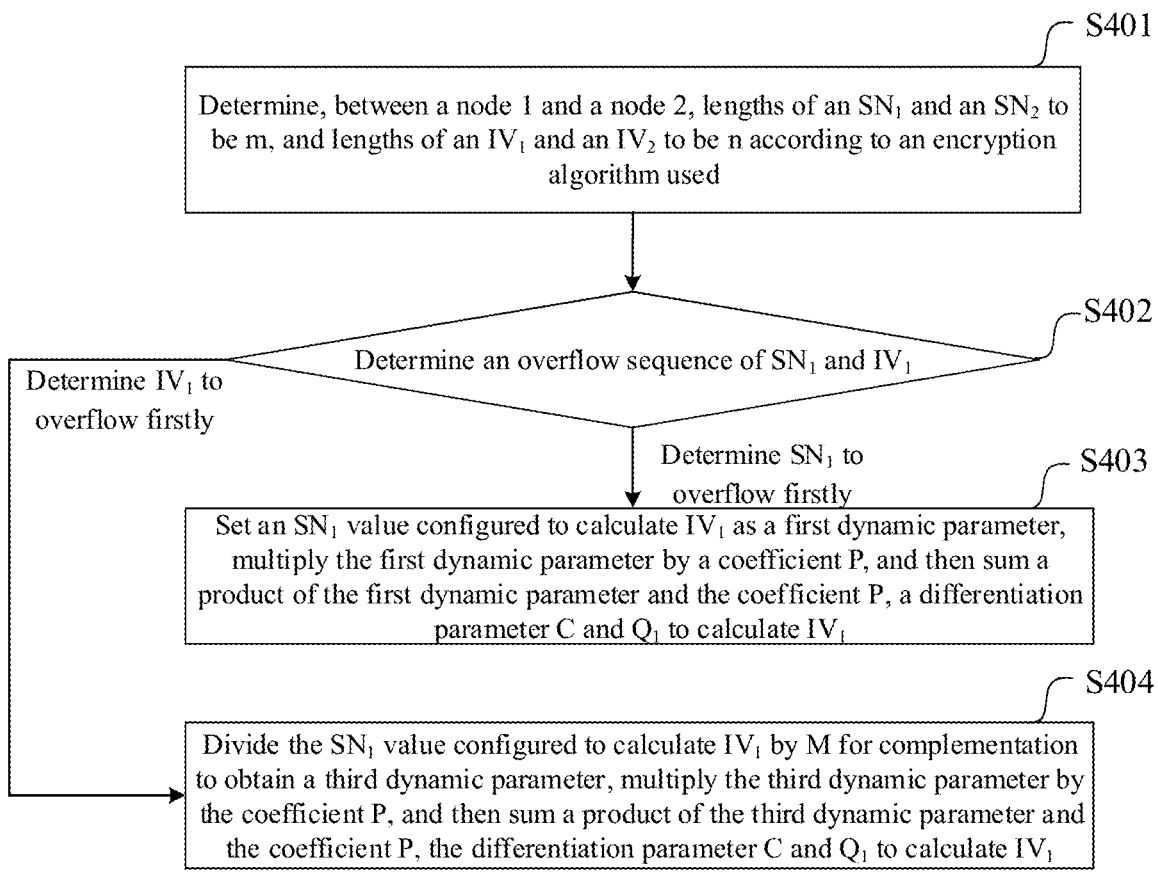
FIG. 3 is a schematic diagram of a differentiation parameter C according to an embodiment of the present application.
FIG. 4 is a flow chart showing that a node 1/node 2 calculates a first initialization vector $IV_1$ according to an embodiment of the present application.

As shown in FIG. 3, a schematic diagram of a differentiation parameter C is provided in an embodiment of the present application. Optionally, the differentiation parameter C may be used as a parameter for calculating an IV value.

A length of C is equal to a length n of $IV_1$, C includes higher-order bits of k bits and lower-order bits of n−k bits, a value of the lower-order bits is zero, a value N of the higher-order bits is non-zero, and k is a positive integer not less than 1 and less than n.

As an optional implementation, the value N of the higher-order bits of C is determined as follows: the value N of the higher-order bits of C is determined in a random mode; or the value N of the higher-order bits of C is determined according to setting information; or the value N of the higher-order bits of C is determined according to an encryption key; or the value N of the higher-order bits of C is determined by means of key negotiation.

The value N may include (1) a fixed value determined according to the setting information, for example, 0x5C365C36, which ensures that 0 and 1 on the bits are balanced as much as possible and distributions of 0 and 1 are sufficiently disordered; (2) a random number determined in a random mode; (3) part of the encryption key determined according to the encryption key; or (4) a certain part of the value determined by means of key negotiation.

When the value N includes (2), (3) or (4), not all of the value N may be 0xFFFFFFFF or a value proximate to 0xFFFFFFFF. That is, not all bit values of the value N may be 1 or a value proximate to 1, and otherwise a key updating frequency is higher.

A length k of the value N is variable, but the length k of the value N is less than the length of C.

As shown in FIG. 4, a flow chart showing that a node 1/node 2 calculates a first initialization vector $IV_1$ is provided in an embodiment of the present application. First mathematical transformation used during calculation of $IV_1$ includes a coefficient P, a first parameter $Q_1$ and a differentiation parameter C. The step that a node 1/node 2 calculates $IV_1$ includes the following.

S401, lengths of an $SN_1$ and an $SN_2$ are determined to be m between the node 1 and the node 2, and lengths of an $IV_1$ and an $IV_2$ are determined to be n according to the encryption algorithm used.

Specific determination processes of the length m and the length n are as described above, which will not be repeated herein.

S402, an overflow sequence of $SN_1$ and $IV_1$ is determined.

As an optional implementation, determining an overflow sequence of $SN_1$ and $IV_1$ includes: calculating a difference between the length n of $IV_1$ and a length k of the higher-order bits; determining $SN_1$ to overflow firstly under the condition that a length m of $SN_1$ is not greater than the difference; and determining $IV_1$ to overflow firstly under the condition that the length m of $SN_1$ is greater than the difference.

The length of the $SN_1$ is m bits, the length of the $IV_1$ is n bits, and the length of N is k bits. m, n, and k are integer multiples of 8.

S403, an $SN_1$ value configured to calculate $IV_1$ is set as a first dynamic parameter, the first dynamic parameter is multiplied by a coefficient P, and then a product of the first dynamic parameter and the coefficient P, a differentiation parameter C and $Q_1$ sum up to calculate $IV_1$ when it is determined that $SN_2$ overflows firstly.

When m<=n−k, for example, when m=32 bits, n=128 bits, and k=32 bits, a calculation mode of the first initialization vector $IV_1$ is as follows: $IV_1=C+SN_1\times P+Q_1$. P is unequal to 1 and 0, and $Q_1$ is 0 or is not an integer multiple of P.

S404, the $SN_1$ value configured to calculate $IV_1$ is divided by M for complementation to obtain a third dynamic parameter, the third dynamic parameter is multiplied by the coefficient P, and then a product of the third dynamic parameter and the coefficient P, the differentiation parameter C and $Q_1$ sum up to calculate $IV_1$ when it is determined that $IV_1$ overflows firstly.

When m>=n−k, for example, when m=128 bits, n=64 bits, and k=32 bits, a calculation mode of the first initialization vector $IV_1$ is as follows: $IV_1=C+SN_1\%2^{n-k}\times P+Q_1$. P is unequal to 1 and 0, and $Q_1$ is 0 or is not an integer multiple of P.

M is a maximum value $2^{n-k}$ that may be represented by the lower-order n−k bits of $IV_1$ when $IV_1$ overflows firstly. The third dynamic parameter is $SN_1\%2^{n-k}$, and represents complementation between the $SN_1$ value and $2^{n-k}$.

$SN_1\%2^{n-k}$ represents that the value of the third dynamic parameter is cyclic from 0 to $2^{n-k}$.

It should be noted that when the $IV_1$ value overflows firstly, the values of the third dynamic parameters are both 1 for two conditions of $SN_1=1$ and $SN_1=2^{n-k}+1$. However, $IV_1$ has overflowed before $SN_1+2^{n-k}+1$. Thus, the key needs to be updated. When different keys are updated, different C values may further be updated to make the calculated $IV_1$ values different. Thus, sufficient randomness is ensured, and it is ensured that the IV values in each round of cycle are different, such that design is more secure.

Moreover, even if the calculated $IV_1$ values in the two conditions of $SN_1=1$ and $SN_1=2^{n-k}+1$ are the same, the keys used are different.

As an optional implementation, before the node 1/node 2 calculates the first initialization vector $IV_1$, the method further includes: starting an updating operation for the key when it is determined that $SN_1$ overflows firstly and the first dynamic parameter, i.e., an $SN_1$ value configured to calculate $IV_1$, reaches a first preset threshold, and using an updated new key as a key used during data sending when it is determined that $SN_1$ overflows firstly and the first dynamic parameter, i.e., an $SN_1$ value configured to calculate $IV_1$, reaches a second preset threshold, where the first preset threshold is less than the second preset threshold, and the second preset threshold is not greater than a maximum value of $SN_1$; and starting an updating operation for the key when it is determined that $IV_1$ overflows firstly and the third dynamic parameter, i.e., $SN_1\%2^{n-k}$, reaches a third preset threshold, and using an updated new key as a key used during data sending when it is determined that $IV_1$ overflows firstly and the third dynamic parameter, i.e., $SN_1\%2^{n-k}$, reaches a fourth preset threshold, where the third preset threshold is less than the fourth preset threshold, and the fourth preset threshold is not greater than a maximum value of lower-order n-k bits of $IV_1$.

It should be noted that the first preset threshold, the second preset threshold, the third preset threshold and the fourth preset threshold may be set to specific values according to specific implementation conditions on the premise of satisfying the size range requirements. For example, it is generally recommended that the first preset threshold is set to 90% of $2^m$, the second preset threshold is set to $2^m-1$, the third preset threshold is set to 90% of $2^{n-k}$, and the fourth preset threshold is set to $2^{n-k}-1$. $2^m$ represents a maximum value that may be represented by $SN_1$, and $2^{n-k}$ represents a maximum value that may be represented by the lower-order n-k bits of $IV_1$ when $IV_1$ overflows firstly.

For security consideration, the C value may also be replaced while replacing with the new key.

As an optional implementation, when starting an updating operation for the key, the method further includes: starting a calculation operation of a new value of a number k of bits of the higher-order bits to generate a new differentiation parameter C; or, starting a calculation operation of a new value N of the higher-order bits of the k bits to generate a new differentiation parameter C.

The new differentiation parameter C is generated while the updating operation for the key is started. A specific mode of generating the new differentiation parameter C may include: (1) calculating a new value k' of a number k of bits of the higher-order bits and calculating a new value N of the higher-order bits of k' bits; or, (2) calculating a new value N of the higher-order bits of k bits without changing a number k of bits of the higher-order bits.

As an optional implementation, when using an updated new key as a key used during data sending, the method further includes: calculating $IV_1$ used during data sending according to the new differentiation parameter C.

(1) A new key is used as a key used during data sending and simultaneously an initialization vector $IV_1$ used during data sending is calculated by using the new differentiation parameter C when it is determined that the $SN_1$ value overflows firstly and the $SN_1$ value configured to calculate $IV_1$ reaches a second preset threshold.

(2) The new key is used as a key used during data sending and simultaneously the initialization vector $IV_1$ used during data sending is calculated by using the new differentiation parameter C when it is determined that the $IV_1$ value overflows firstly and $SN_1\%2^{n-k}$ reaches a fourth preset threshold.

It should be noted that the value N of the higher-order bits of the differentiation parameter C according to the embodiment of FIG. 3 is non-zero. As another optional implementation, a value N of higher-order bits of a differentiation parameter C may also be zero. In this case, the value of C is zero. That is, in the embodiment of FIG. 4, a calculation mode of the first initialization vector $IV_1$ is changed to: $IV_1=SN_1\times P+Q_1$ when $m<=n-k$, where P is unequal to 1 and 0, and $Q_1$ is 0 or is not an integer multiple of P; and $IV_1=SN_1\%2^{n-k}\times P+Q_1$ when $m>n-k$, where P is unequal to 1 and 0, and $Q_1$ is 0 or is not an integer multiple of P. Compared with the condition in which the value N of the higher-order bits of the differentiation parameter C is zero, the condition in which the value N of the higher-order bits of the differentiation parameter C is non-zero can ensure that the calculated $IV_1$ value has higher randomness, thereby greatly enhancing security of data encryption.

Figure 5:
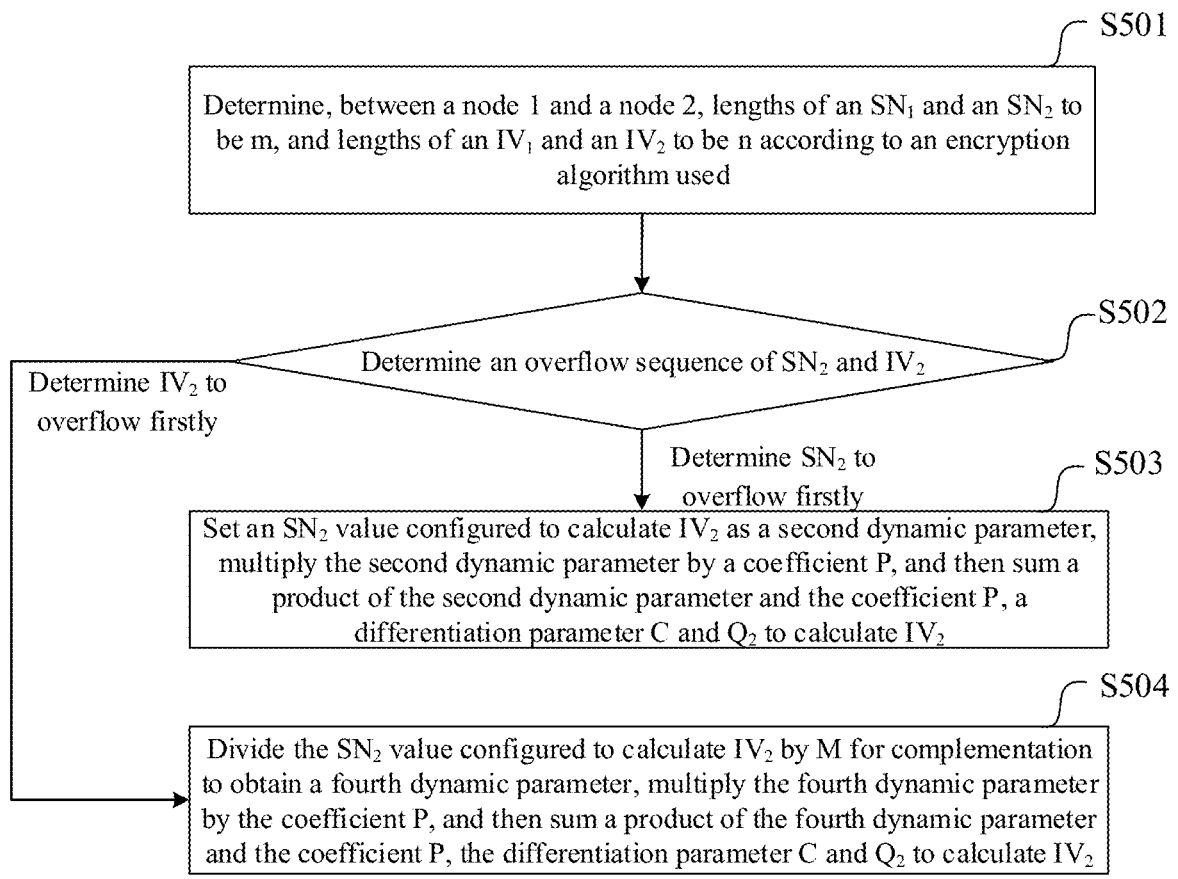
FIG. 5 is a flow chart showing that a node 2/node 1 calculates the second initialization vector $IV_2$ according to an embodiment of the present application.

As shown in FIG. 5, a flow chart showing that a node 2/node 1 calculates a second initialization vector $IV_2$ is provided in an embodiment of the present application. Second mathematical transformation used during calculation of $IV_2$ includes a coefficient P, a second parameter $Q_2$ and a differentiation parameter C. The second parameter $Q_2$ in the second mathematical transformation has a value different from that of a first parameter $Q_1$ in first mathematical transformation. The step that the node 2/node 1 calculates $IV_2$ includes the following.

S501, lengths of an $SN_1$ and an $SN_2$ are determined to be m between a node 1 and a node 2, and lengths of an $IV_1$ and an $IV_2$ are determined to be n according to the encryption algorithm used.

Specific determination processes of the length m and the length n are as described above, which will not be repeated herein.

S502, an overflow sequence of $SN_2$ and $IV_2$ is determined.

As an optional implementation, determining an overflow sequence of $SN_2$ and $IV_2$ includes: calculating a difference between the length n of $IV_2$ and a length k of the higher-order bits; determining $SN_2$ to overflow firstly under the condition that a length m of $SN_2$ is not greater than the difference; and determining $IV_2$ to overflow firstly under the condition that the length m of $SN_2$ is greater than the difference.

The length of $SN_2$ is m bits, the length of $IV_2$ is n bits, and the length of N is k bits. Herein, m, n, and k are integer multiples of 8.

S503, an $SN_2$ value configured to calculate $IV_2$ is set as a second dynamic parameter, the second dynamic parameter is multiplied by the coefficient P, and then a product of the second dynamic parameter and the coefficient P, the differentiation parameter C and a second parameter $Q_2$ sum up to calculate $IV_2$ when it is determined that $SN_2$ overflows firstly.

When $m<=n-k$, for example, when m=32 bits, n=128 bits, and k=32 bits, a calculation mode of the second initialization vector $IV_2$ is as follows: $IV_2=C+SN_2\times P+Q_2$. P is unequal to 1 and 0, $Q_2$ is 0 or is not an integer multiple of P, and $Q_1$ is different from $Q_2$.

S504, the $SN_2$ value configured to calculate $IV_2$ is divided by M for complementation to obtain a fourth dynamic parameter, the fourth dynamic parameter is multiplied by the coefficient P, and then a product of the fourth dynamic parameter and the coefficient P, the differentiation parameter C and $Q_2$ sum up to calculate $IV_2$ when it is determined that $IV_2$ overflows firstly.

When m>n−k, for example, when m=128 bits, n=64 bits, and k=32 bits, a calculation mode of the second initialization vector $IV_2$ is as follows: $IV_2=C+SN_2\%2^{n-k}\times P+Q_2$. P is unequal to 1 and 0, $Q_2$ is 0 or is not an integer multiple of P, and $Q_1$ is different from $Q_2$.

M is a maximum value $2^{n-k}$ that may be represented by the lower-order n−k bits of $IV_2$ when $IV_2$ overflows firstly. The fourth dynamic parameter is $SN_2\%2^{n-k}$, and represents complementation between the $SN_2$ value and $2^{n-k}$.

$SN_2\%2^{n-k}$ represents that the value of the fourth dynamic parameter is cyclic from 0 to $2^{n-k}-1$.

It should be noted that when the $IV_2$ value overflows firstly, the values of the fourth dynamic parameters are both 1 for two conditions of $SN_2=1$ and $SN_2=2^{n-k}+1$. However, $IV_2$ has overflowed before $SN_2=2^{n-k}+1$. Thus, the key needs to be updated. When different keys are updated, different C values may further be updated to make the calculated $IV_2$ values different. Thus, sufficient randomness is ensured, and it is ensured that the IV values in each round of cycle are different, such that design is more secure.

Moreover, even if the calculated $IV_2$ values in the two conditions of $SN_2=1$ and $SN_2=2^{n-k}+1$ are the same, the encryption keys used are different.

As an optional implementation, before the node 2/node 1 calculates the second initialization vector $IV_2$, the method further includes: starting an updating operation for the key when it is determined that $SN_2$ overflows firstly and the second dynamic parameter, i.e., an $SN_2$ value configured to calculate $IV_2$, reaches a first preset threshold, and using an updated new key as a key used during data sending when t is determined that $SN_2$ overflows firstly and the second dynamic parameter, i.e., the $SN_2$ value configured to calculate $IV_2$, reaches a second preset threshold, where the first preset threshold is less than the second preset threshold, and the second preset threshold is not greater than a maximum value of $SN_2$; and starting an updating operation for the key when it is determined that $IV_2$ overflows firstly and the fourth dynamic parameter, i.e., $SN_2\%2^{n-k}$, reaches a third preset threshold, and using an updated new key as a key used during data sending when it is determined that $IV_2$ overflows firstly and the fourth dynamic parameter, i.e., $SN_2\%2^{n-k}$, reaches a fourth preset threshold, where the third preset threshold is less than the fourth preset threshold, and the fourth preset threshold is not greater than a maximum value of lower-order n−k bits of $IV_2$.

It should be noted that the first preset threshold, the second preset threshold, the third preset threshold and the fourth preset threshold may be set to specific values according to specific implementation conditions on the premise of satisfying the size range requirements. For example, it is generally recommended that the first preset threshold is set to 90% of $2^m$, the second preset threshold is set to $2^m-1$, the third preset threshold is set to 90% of $2^{n-k}$, and the fourth preset threshold is set to $2^{n-k}-1$. Herein, $2^m$ represents a maximum value that may be represented by $SN_2$, and $2^{n-k}$ represents a maximum value that may be represented by the lower-order n−k bits of the $IV_2$ when $IV_2$ overflows firstly.

For security consideration, the C value may also be replaced while replacing with the new key, and the mode of generating the new differentiation parameter C is the same as that according to the embodiment of FIG. 4, which will not be repeated herein.

As an optional implementation, when using an updated new key as a key used during data sending, the method further includes: calculating an $IV_2$ used during data sending according to the new differentiation parameter C.

(1) A new key is used as a key used during data sending and simultaneously an initialization vector $IV_2$ used during data sending is calculated by using the new differentiation parameter C when it is determined that the $SN_2$ value overflows firstly and the $SN_2$ value configured to calculate $IV_2$ reaches a second preset threshold.

(2) The new key is used as a key used during data sending and simultaneously calculate the initialization vector $IV_2$ used during data sending is calculated by using the new differentiation parameter C when it is determined that the $IV_2$ value overflows firstly and $SN_2\%2^{n-k}$ reaches a fourth preset threshold.

As an optional implementation, in the embodiments of FIG. 4 and FIG. 5, the node 1 and the node 2 may pre-prepare new C values and new keys. When the key and the C value need to be updated, the node 1 and the node 2 jointly select a new key from the keys pre-prepared as a key used during data sending, and select a new C value from the new C values pre-prepared to calculate the initialization vector (IV) used during data sending.

It should be noted that the value N of the higher-order bits of the differentiation parameter C according to the embodiment of FIG. 3 is non-zero. As another optional implementation, a value N of higher-order bits of a differentiation parameter C may also be zero. In this case, the value of C is zero. That is, in the embodiment of FIG. 5, a calculation mode of the second initialization vector $IV_2$ is changed to: $IV_2=SN_2\times P+Q_2$ when m<=n−k, where P is unequal to 1 and 0, $Q_2$ is 0 or is not an integer multiple of P, and $Q_2$ is different from $Q_1$; and $IV_2=SN_2\%2^{n-k}\times P+Q_2$ when m>n−k, where P is unequal to 1 and 0, $Q_2$ is 0 or is not an integer multiple of P, and $Q_2$ is different from $Q_1$. Compared with the condition in which the value N of the higher-order bits of the differentiation parameter C is zero, the condition in which the value N of the higher-order bits of the differentiation parameter C is non-zero can ensure that the calculated $IV_2$ value has higher randomness, thereby greatly enhancing security of data encryption.

The node 1 and the node 2 can communicate by means of a mode of data secure transmission having an encapsulation format, or a mode of data secure transmission having no encapsulation format.

Figure 6:
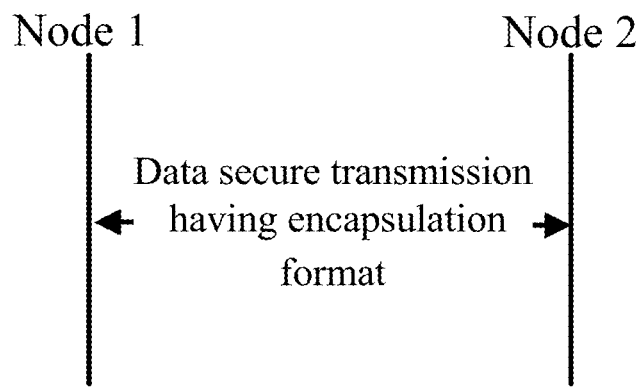
FIG. 6 is a schematic diagram of data secure transmission having an encapsulation format according to an embodiment of the present application.

As shown in FIG. 6, a schematic diagram of data secure transmission having an encapsulation format is provided in an embodiment of the present application. It is assumed that communication traffic from a node 1 to a node 2 is $DATA_{1to2}$, communication traffic from the node 2 to the node 1 is $DATA_{2to1}$, and a key jointly used by the node 1 and the node 2 is Key.

Data traffic interaction between the node 1 and the node 2 executes the following steps.

S1, both communicating parties configure lengths of serial numbers $SN_1$ and $SN_2$, and initialize an $SN_1$ value and an $SN_2$ value.

S2, the node 1 calculates an $IV_1$ value according to the length of the $SN_1$ and the $SN_1$ value, and the node 2 calculates an $IV_2$ value according to the length of the $SN_2$ and the $SN_2$ value.

For example, the lengths of $SN_1$ and $SN_2$ are both m bits, the lengths of $IV_1$ and $IV_2$ are both n bits, and a length of higher-order bits of a differentiation parameter C is k bits. m, n, and k are integer multiples of 8. When m=32 bits, n=128 bits, and k=32 bits are taken, m<=n-k, which indicates that SN values of the node 1 and the node 2 overflow firstly. $IV_1$ of the node 1 is equal to $C+SN_1 \times P+Q_1$, where P is unequal to 1 and 0, and $Q_1$ is 0 or is not an integer multiple of P. $IV_2$ of the node 2 is equal to $C+SN_2 \times P+Q_2$, where P is unequal to 1 and 0, $Q_2$ is 0 or is not an integer multiple of P, and $Q_2$ is unequal to $Q_1$.

Each time the node 1 sends a data packet to the node 2, the $SN_1$ value of the node 1 is incrementally updated. For example, the $SN_1$ value is updated by adding 1. When the $SN_1$ value reaches a first preset threshold, an updating operation for the key is started. When the $SN_1$ value reaches a second preset threshold, an updated new key is used as a key used during data sending.

Each time the node 2 sends a data packet to the node 1, the $SN_2$ value of the node 2 is incrementally updated. For example, the $SN_2$ value is updated by adding 1. When the $SN_2$ value reaches the first preset threshold, an updating operation for the key is started. When the $SN_2$ value reaches the second preset threshold, an updated new key is used as a key used during data sending.

For another example, when m=128 bits, n=64 bits, and k=32 bits, m>n-k, which indicates that IV values of the node 1 and the node 2 overflow firstly. $IV_1$ of the node 1 is equal to $C+SN_1 \% 2^{n-k} \times P+Q_1$, where P is unequal to 1 and 0, and $Q_1$ is 0 or is not an integer multiple of P. $IV_2$ of the node 2 is equal to $C+SN_2 \% 2^{n-k} \times P+Q_2$, where P is unequal to 1 and 0, $Q_2$ is 0 or is not an integer multiple of P, and $Q_2$ is unequal to $Q_1$.

Each time the node 1 sends a data packet to the node 2, the $SN_1$ value of the node 1 is incrementally updated. Since the $IV_1$ value overflows before the $SN_1$ value, when $SN_1 \% 2^{n-k}$ reaches a third preset threshold, an updating operation for a key is started. When $SN_1 \% 2^{n-k}$ reaches a fourth preset threshold, an updated new key is used as a key used during data sending.

Each time the node 2 sends a data packet to the node 1, the $SN_2$ value of the node 2 is incrementally updated. Since the $IV_2$ value overflows before the $SN_2$ value, an updating operation for a key is started when $SN_2 \% 2^{n-k}$ reaches the third preset threshold. When $SN_2 \% 2^{n-k}$ reaches the fourth preset threshold, an updated new key is used as a key during data sending.

For P, $Q_1$ and $Q_2$, preferably P is set as 2, $Q_1$ is set as 0 and $Q_2$ is set as −1. The smaller the value is, the less likely $IV_1$ and $IV_2$ overflow, and the less a key updating frequency is, and thus performance is better.

Certainly, P, $Q_1$, and $Q_2$ may also be set according to specific implementation conditions. For example, P=3, $Q_1$=2, and $Q_2$=1 may be set.

S3, traffic on both communication parties is encrypted and decrypted by using the $IV_1/IV_2$ value calculated and an encryption algorithm.

It should be noted that the node 1 and the node 2 communicate by means of data secure transmission having an encapsulation format. Before the node 1 sends $DATA_{1to2}$ to the node 2, the node 1 encrypts $DATA_{1to2}$ according to the Key and the calculated $IV_1$ value in combination with the encryption algorithm, encapsulates encrypted traffic according to an encapsulation protocol, and sends encapsulated traffic to the node 2 after completion. After receiving the encrypted traffic sent by the node 1, the node 2 obtains the $SN_1$ value from an encapsulated message, and decrypts the encrypted traffic according to the $IV_1$ value calculated by the node 2 and the Key in combination with the encryption algorithm to obtain $DATA_{1to2}$.

Similarly, before the node 2 sends $DATA_{2to1}$ to the node 1, the node 2 encrypts $DATA_{2to1}$ by using the Key and the calculated $IV_2$ value in combination with the encryption algorithm, encapsulates encrypted traffic according to an encapsulation protocol, and sends encapsulated traffic to the node 1 after completion. After receiving the encrypted traffic sent by the node 2, the node 1 obtains the $SN_2$ value from an encapsulated message, and decrypts the encrypted traffic according to the $IV_2$ value calculated by the node 2 and the Key in combination with the encryption algorithm to obtain $DATA_{2to1}$.

Figure 7:
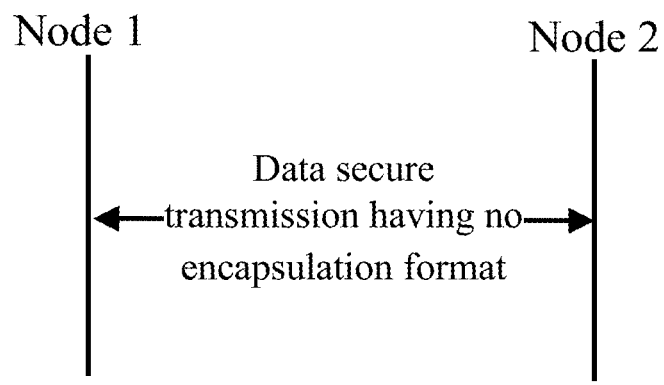
FIG. 7 is a schematic diagram of data secure transmission having no encapsulation format according to an embodiment of the present application.

As shown in FIG. 7, a schematic diagram of data secure transmission having no encapsulation format is provided in an embodiment of the present application. It is assumed that communication traffic from a node 1 to a node 2 is $DATA_{1to2}$, communication traffic from the node 2 to the node 1 is $DATA_{2to1}$, and a key jointly used by the node 1 and the node 2 is Key.

Data traffic interaction between the node 1 and the node 2 executes the following steps.

S1, both communicating parties configure lengths of serial numbers $SN_1$ and $SN_2$, and initialize an $SN_1$ value and an $SN_2$ value.

S2, the node 1 calculates an IV value according to the length of $SN_1$ and the $SN_1$ value, and the node 2 calculates an $IV_2$ value according to the length of $SN_2$ and the $SN_2$ value.

A calculation process herein is the same as that in the embodiment of FIG. 6, which will not be repeated.

S3, traffic on both communication parties is encrypted and decrypted by using the $IV_1/IV_2$ value calculated and an encryption algorithm.

It should be noted that the node 1 and the node 2 communicate by means of data secure transmission having no encapsulation format. Before the node 1 sends $DATA_{1to2}$ to the node 2, the node 1 encrypts $DATA_{1to2}$ by using the Key and the calculated $IV_1$ value in combination with the encryption algorithm, does not need to encapsulate encrypted traffic according to an encapsulation protocol, and directly sends encrypted traffic to the node 2. After receiving the encrypted traffic sent by the node 1, the node 2 obtains the $SN_2$ value from the encrypted traffic, and decrypts the encrypted traffic according to the $IV_1$ value calculated by the node 2 and the Key in combination with the encryption algorithm to obtain $DATA_{1to2}$.

Similarly, before the node 2 sends $DATA_{2to1}$ to the node 1, the node 2 encrypts $DATA_{2to1}$ by using the Key and the calculated $IV_2$ value in combination with the encryption algorithm, does not need to encapsulate encrypted traffic according to an encapsulation protocol, and directly sends encrypted traffic to the node 1. After receiving the encrypted traffic sent by the node 2, the node 1 obtains the $SN_2$ value from the encrypted traffic, and decrypts the encrypted traffic according to the $IV_2$ value calculated by the node 1 and the Key in combination with the encryption algorithm to obtain $DATA_{2to1}$.

The embodiments of the present application will be described below by taking data secure transmission having an encapsulation format as an example. The data secure transmission having an encapsulation format and data secure transmission having no encapsulation format are basically the same except that the data secure transmission having no encapsulation format does not need encapsulation, which will not be repeated hereinafter.

Figure 8:
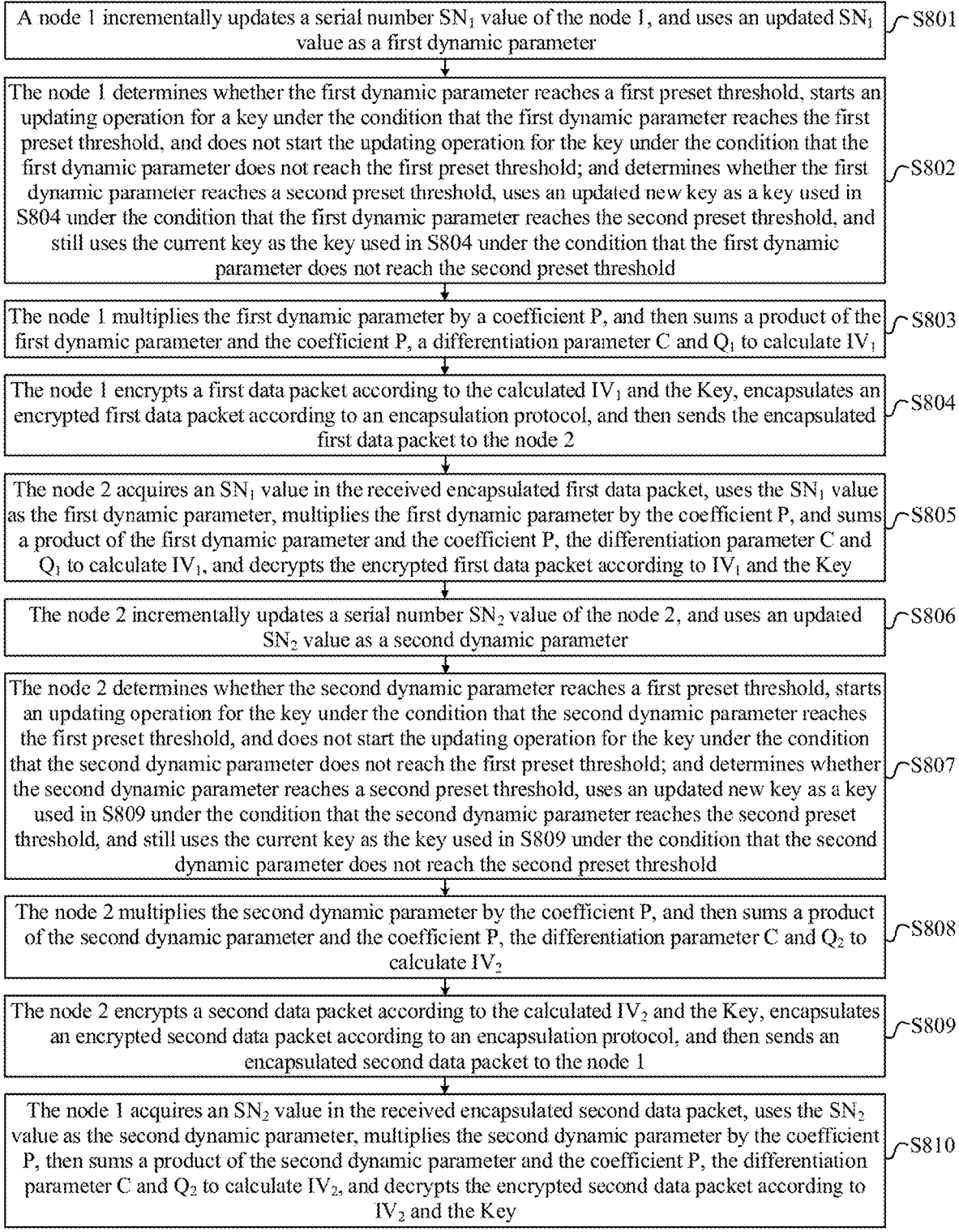
FIG. 8 is a flow chart of data secure transmission having an encapsulation format according to an embodiment of the present application.

As shown in FIG. 8, a flow chart for data secure transmission having an encapsulation format is provided in an embodiment of the present application. $SN_1$ overflowing before $IV_1$ and $SN_2$ overflowing before $IV_2$ will be described as an example. It should be noted that in the embodiment, before data secure transmission is performed between the node 1 and the node 2, lengths of $SN_1$ and $SN_2$ have been determined to be m between the node 1 and the node 2, and an $SN_1$ value and an $SN_2$ value are initialized. According to an encryption algorithm used, the lengths of $IV_1$ and $IV_2$ are determined to be n. As an optional implementation, the encryption algorithm used above is a symmetric encryption algorithm.

Flows of the data secure transmission having an encapsulation format according to the embodiment of FIG. 8 include the following.

S801, a node 1 incrementally updates a serial number $SN_1$ value of the node 1, and uses an updated $SN_1$ value as a first dynamic parameter.

S802, the node 1 determines whether the first dynamic parameter reaches a first preset threshold, starts an updating operation for a key under the condition that the first dynamic parameter reaches the first preset threshold, and does not start the updating operation for the key under the condition that the first dynamic parameter does not reach the first preset threshold; and determines whether the first dynamic parameter reaches a second preset threshold, uses an updated new key as a key used in S804 under the condition that the first dynamic parameter reaches the second preset threshold, and still uses the current key as the key used in S804 under the condition that the first dynamic parameter does not reach the second preset threshold.

For example, the first preset threshold may be $0.9 \times 2^m$, whether the $SN_1$ value reaches 90% of $2^m$ is determined, and if so, the updating operation for the key is started. Optionally, when the updating operation for the key is started, an updating operation for the differentiation parameter C may further be started. For example, the second preset threshold may be $2^m-1$, and whether the $SN_1$ value reaches $2^m-1$ is determined. The first preset threshold is less than the second preset threshold, and the second preset threshold is not greater than a maximum value of $SN_1$. Optionally, $IV_1$ may further be calculated in S803 by using a new differentiation parameter C when the updated new key is used as the key used in S804.

S803, the node 1 multiplies the first dynamic parameter by a coefficient P, and then sums a product of the first dynamic parameter and the coefficient P, a differentiation parameter C and $Q_1$ to calculate $IV_1$.

For example, if an increment value is 1, the node 1 adds 1 to the current $SN_1$ value, takes P=2 and $Q_1=0$, and calculates $IV_1$ by using $IV_1=C+SN_1 \times 2$.

S804, the node 1 encrypts a first data packet according to the calculated $IV_1$ and the Key, encapsulates an encrypted first data packet according to an encapsulation protocol, and then sends the encapsulated first data packet to the node 2.

The node 1 encrypts, by using $IV_1$ and the Key as two input parameters of an encryption algorithm, $DATA_{1to2}$ by using the symmetric encryption algorithm, i.e., $(DATA_{1to2})_{ciphertext} = FUN_{encrypt}(IV_1, Key, DATA_{1to2})$, then encapsulates $(DATA_{1to2})_{ciphertext}$ according to the encapsulation protocol, and sends encapsulated $(DATA_{1to2})_{ciphertext}$ to the node 2 after completion.

It should be noted that after sending the encrypted first data packet to the node 2, the node 1 may execute relevant steps anew from S801 to calculate new $IV_1$, and encrypts a data packet subsequently sent to the node 2 according to the calculated $IV_1$ and the key. After the node 1 sends a plurality of encrypted data packets to the node 2, if the $SN_1$ value of the node 1 overflows, the node 1 initializes the $SN_1$ value, and then executes relevant steps from S801.

S805, the node 2 acquires an $SN_1$ value in the received encapsulated first data packet, uses the $SN_1$ value as the first dynamic parameter, multiplies the first dynamic parameter by the coefficient P, and sums a product of the first dynamic parameter and the coefficient P, the differentiation parameter C and $Q_1$ to calculate $IV_1$, and decrypts the encrypted first data packet according to the calculated $IV_1$ and the Key.

When receiving communication traffic of the node 1, the node 2 acquires the $SN_1$ value in an encapsulated message, calculates $IV_1$ by using $IV_1=C+SN_1 \times 2$, and decrypts, by using $IV_1$ and the Key as two input parameters of the encryption algorithm, $(DATA_{1to2})_{ciphertext}$ by using the symmetric encryption algorithm, i.e., $(DATA_{1to2})_{plaintext} = FUN_{decipher}(IV_1, Key, (DATA_{1to2})_{ciphertext})$.

S806, the node 2 incrementally updates a serial number $SN_2$ value of the node 2, and uses an updated $SN_2$ value as a second dynamic parameter.

S807, the node 2 determines whether the second dynamic parameter reaches a first preset threshold, starts an updating operation for the key under the condition that the second dynamic parameter reaches the first preset threshold, and does not start the updating operation for the key under the condition that the second dynamic parameter does not reach the first preset threshold; and determines whether the second dynamic parameter reaches a second preset threshold, uses an updated new key as a key used in S809 under the condition that the second dynamic parameter reaches the second preset threshold, and still uses the current key as the key used in S809 under the condition that the second dynamic parameter does not reach the second preset threshold.

For example, the first preset threshold may be $0.9 \times 2^m$, and whether the $SN_2$ value reaches 90% of $2^m$ is determined, and if so, the updating operation for the key is started. Optionally, when the updating operation for the key is started, an updating operation for the differentiation parameter C may further be started. For example, the second preset threshold may be $2^m-1$, and whether the $SN_2$ value reaches $2^m-1$ is determined. The first preset threshold is less than the second preset threshold, and the second preset threshold is not greater than a maximum value of $SN_2$. Optionally, $IV_2$ may further be calculated in S808 according to a new differentiation parameter C when the updated new key is used as the key used in S809.

S808, the node 2 multiplies the second dynamic parameter by the coefficient P, and then sums a product of the second dynamic parameter and the coefficient P, the differentiation parameter C and $Q_2$ to calculate $IV_2$.

For example, if an increment value is 1, the node 2 adds 1 to the $SN_2$ value, takes P=2 and $Q_2=-1$, and calculates $IV_2$ according to $IV_2=C+SN_2 \times 2-1$.

S809, the node 2 encrypts a second data packet according to the calculated $IV_2$ and the Key, encapsulates an encrypted second data packet according to an encapsulation protocol, and then sends an encapsulated second data packet to the node 1.

The node 2 encrypts, by using $IV_2$ and the Key as two input parameters of an encryption algorithm, $DATA_{2to1}$ by using the symmetric encryption algorithm, i.e., $(DATA_{2to1})_{ciphertext} = FUN_{encrypt}(IV_2, Key, DATA_{2to1})$, then encapsulates $(DATA_{2to1})_{ciphertext}$ according to the encapsulation protocol, and sends encapsulated $(DATA_{2to1})_{ciphertext}$ to the node 1 after completion.

It should be noted that after sending the encrypted second data packet to the node 1, the node 2 may execute relevant steps anew from S806 to calculate a new $IV_2$, and encrypts a data packet subsequently sent to the node 1 by using the calculated $IV_2$ and the key. After the node 2 sends a plurality of encrypted data packets to the node 1, if the $SN_2$ value of the node 2 overflows, the node 2 initializes the $SN_2$ value, and then executes relevant steps from S806.

S810, the node 1 acquires an $SN_2$ value in the received encapsulated second data packet, uses the $SN_2$ value as the second dynamic parameter, multiplies the second dynamic parameter by the coefficient P, and sums a product of the second dynamic parameter and the coefficient P, the differentiation parameter C and $Q_2$ to calculate $IV_2$, and decrypts the encrypted second data packet according to $IV_2$ and the Key.

When receiving communication traffic of the node 2, the node 1 acquires the $SN_2$ value in an encapsulated message, calculates $IV_2$ by using $IV_2 = C + SN_2 \times 2 - 1$, and decrypts, by using $IV_2$ and the Key as two input parameters of the encryption algorithm, $(DATA_{2to1})_{ciphertext}$ by using the symmetric encryption algorithm, i.e., $(DATA_{2to1})_{plaintext} = FUN_{decipher}(IV_2, Key, (DATA_{2to1})_{ciphertext})$.

and the $SN_2$ value is odd (for example, the initial value of $SN_1$ is 1), and the other one is even (for example, the initial value of $SN_2$ is 2). The $SN_1$ value and the $SN_2$ value need to be processed by adding 2 in each subsequent round of processing. Thus, it is ensured that $IV_1$ calculated by the node 1 and $IV_2$ calculated by the node 2 are different.

Since the solution of the present application uses a specific mode of IV calculation, the corresponding SN values of the node 1 and the node 2 may be the same, and only 1 needs to be added to the corresponding SN values in each round of processing. Thus, a use space of $SN_1$ and $SN_2$ in the solution of the present application is twice larger than that of $SN_1$ and $SN_2$ in the prior art, overflow becomes slower, and a corresponding key updating frequency is reduced by one time. Thus, system performance can be effectively improved.

Figure 9:
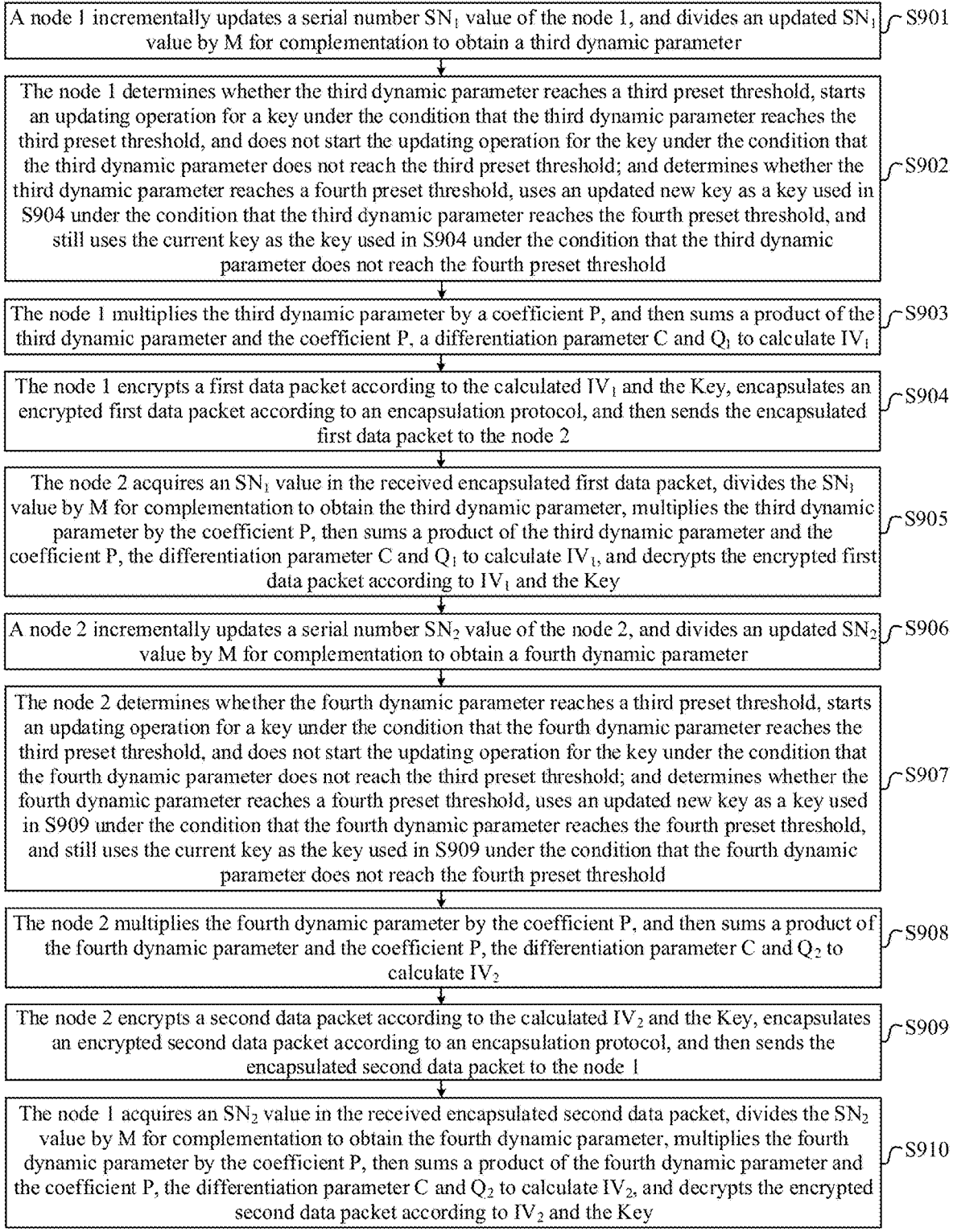
FIG. 9 is a flow chart of another data secure transmission having an encapsulation format according to an embodiment of the present application.

As shown in FIG. 9, a flow chart of another data secure transmission having an encapsulation format is provided in an embodiment of the present application. $SN_1$ overflowing before $IV_1$ and $SN_2$ overflowing before $IV_2$ will be described as an example. It should be noted that in the embodiment, before data secure transmission is performed between the node 1 and the node 2, lengths of $SN_1$ and $SN_2$ have been

TABLE 1

Comparison of SN value changes between the solution of the embodiment of the present application and the solution of the prior art

| Solution of embodiment of the present application | | | | Solution of the prior art | | | |
|---|---|---|---|---|---|---|---|
| Node 1 | | Node 2 | | Node 1 | | Node 2 | |
| $SN_1$ | $IV_1 = C + SN_1 \times 2$ | $SN_2$ | $IV_2 = C + SN_2 \times 2 - 1$ | $SN_1$ | $IV_1 = SN_1$ | $SN_2$ | $IV_2 = SN_2$ |
| 1 | 2 + C | 1 | 1 + C | 1 | 1 | 2 | 2 |
| 2 | 4 + C | 2 | 3 + C | 3 | 3 | 4 | 4 |
| 3 | 6 + C | 3 | 5 + C | 5 | 5 | 6 | 6 |
| 4 | 8 + C | 4 | 7 + C | 7 | 7 | 8 | 8 |
| 5 | 10 + C | 5 | 9 + C | 9 | 9 | 10 | 10 |
| 6 | 12 + C | 6 | 11 + C | 11 | 11 | 12 | 12 |
| 7 | 14 + C | 7 | 13 + C | 13 | 13 | 14 | 14 |
| 8 | 16 + C | 8 | 15 + C | 15 | 15 | 16 | 16 |
| 9 | 18 + C | 9 | 17 + C | 17 (overflow) | 17 | 18 (overflow) | 18 |
| 10 | 20 + C | 10 | 19 + C | | | | |
| 11 | 22 + C | 11 | 21 + C | | | | |
| 12 | 24 + C | 12 | 23 + C | | | | |
| 13 | 26 + C | 13 | 25 + C | | | | |
| 14 | 28 + C | 14 | 27 + C | | | | |
| 15 | 30 + C | 15 | 29 + C | | | | |
| 16 | 32 + C | 16 | 31 + C | | | | |

In Table 1 above, comparison of SN value changes between the solution of the present application and the solution of the prior art is deduced. In Table 1, the length of $SN_1$ and $SN_2$ is set to 4 bits. That is, a maximum value of $SN_1$ and $SN_2$ is 16. Initial values of $SN_1$ and $SN_2$ in the solution of the embodiment of the present application start from 1. Assuming P=2, $Q_1$=0 and $Q_2$=−1, values of P, $Q_1$ and $Q_2$ are substituted into the solution of the node 1 and the node 2, it may be found that the $SN_1$ value and the $SN_2$ value only need to be processed by adding 1 in each subsequent round of processing. According to a mode of IV calculation according to the embodiment of the present application, $IV_1$ calculated by the node 1 according to the $SN_1$ value and $IV_2$ calculated by the node 2 according to the $SN_2$ value are different.

However, in the solution of the prior art, in order to ensure that two nodes use different IV values, a method in the solution of the prior art requires that one of the $SN_1$ value determined to be m between the node 1 and the node 2, and an $SN_1$ value and an $SN_2$ value are initialized. According to an encryption algorithm used, the lengths of $IV_1$ and $IV_2$ are determined to be n. As an optional implementation, the encryption algorithm used above is a symmetric encryption algorithm.

Flows of the data secure transmission having an encapsulation format according to the embodiment of FIG. 9 include the following.

S901, a node 1 incrementally updates a serial number $SN_1$ value of the node 1, and divides an updated $SN_1$ value by M for complementation to obtain a third dynamic parameter.

S902, the node 1 determines whether the third dynamic parameter reaches a third preset threshold, starts an updating operation for a key under the condition that the third dynamic parameter reaches the third preset threshold, and does not start the updating operation for the key under the condition that the third dynamic parameter does not reach the third preset threshold; and determines whether the third dynamic parameter reaches a fourth preset threshold, uses an updated new key as a key used in S904 under the condition that the third dynamic parameter reaches the fourth preset threshold, and still uses the current key as the key used in S904 under the condition that the third dynamic parameter does not reach the fourth preset threshold.

For example, the third preset threshold may be $0.9 \times 2^{n-k}$, whether $SN_1 \% 2^{n-k}$ reaches 90% of $2^{n-k}$ is determined, and if so, the updating operation for the key is started. Optionally, when the updating operation for the key is started, an updating operation for the differentiation parameter C may further be started. For example, the fourth preset threshold may be $2^{n-k}-1$, and whether $SN_1 \% 2^{n-k}$ reaches $2^{n-k}-1$ is determined. The third preset threshold is less than the fourth preset threshold, and the fourth preset threshold is not greater than a maximum value of the lower-order n-k bits of $IV_1$. Optionally, $IV_1$ may further be calculated in S903 by using a new differentiation parameter C when the updated new key is used as the key used in S904.

S903, the node 1 multiplies the third dynamic parameter by a coefficient P, and then sums a product of the third dynamic parameter and the coefficient P, a differentiation parameter C and $Q_1$ to calculate $IV_1$.

M represents a maximum value $2^{n-k}$ of n-k lower-order bits of $IV_1$ when $IV_1$ overflows firstly. For example, if an increment value is 1, the node 1 adds 1 to the current $SN_1$ value, takes P=2 and $Q_1$=0, and calculates $IV_1$ by using $IV_1 = C + SN_1 \% 2^{n-k} \times 2$.

S904, the node 1 encrypts a first data packet according to the calculated $IV_1$ and the Key, encapsulates an encrypted first data packet according to an encapsulation protocol, and then sends the encapsulated first data packet to the node 2.

The node 1 encrypts, by using $IV_1$ and the Key as two input parameters of an encryption algorithm, $DATA_{1to2}$ by using the symmetric encryption algorithm, i.e., $(DATA_{1to2})_{ciphertext} = FUN_{encrypt}(IV_1, Key, DATA_{1to2})$, then encapsulates $(DATA_{1to2})_{ciphertext}$ according to the encapsulation protocol, and sends encapsulated $(DATA_{1to2})_{ciphertext}$ to the node 2 after completion.

It should be noted that after sending the encrypted first data packet to the node 2, the node 1 may execute relevant steps anew from S901 to calculate new $IV_1$, and encrypts a data packet subsequently sent to the node 2 according to the calculated $IV_1$ and the key. After the node 1 sends a plurality of encrypted data packets to the node 2, if the $SN_1$ value of the node 1 overflows, the node 1 initializes the $SN_1$ value, and then executes relevant steps from S901.

S905, the node 2 acquires an $SN_1$ value in the received encapsulated first data packet, divides the $SN_1$ value by M for complementation to obtain the third dynamic parameter, multiplies the third dynamic parameter by the coefficient P, and sums a product of the third dynamic parameter and the coefficient P, the differentiation parameter C and $Q_1$ to calculate $IV_1$, and decrypts the encrypted first data packet according to $IV_1$ and the Key.

When receiving communication traffic of the node 1, the node 2 acquires an $SN_1$ value in an encapsulated message, calculates $IV_1$ by using $IV_1 = C + SN_1 \% 2^{n-k} \times 2$, and decrypts, by using $IV_1$ and the Key as two input parameters of the encryption algorithm, $(DATA_{1to2})_{ciphertext}$ by using the symmetric encryption algorithm, i.e., $(DATA_{1to2})_{plaintext} = FUN_{decipher}(IV_1, Key, (DATA_{1to2})_{ciphertext})$.

S906, a node 2 incrementally updates a serial number $SN_2$ value of the node 2, and divides an updated $SN_2$ value by M for complementation to obtain a fourth dynamic parameter.

S907, the node 2 determines whether the fourth dynamic parameter reaches a third preset threshold, starts an updating operation for a key under the condition that the fourth dynamic parameter reaches the third preset threshold, and does not start the updating operation for the key under the condition that the fourth dynamic parameter does not reach the third preset threshold; and determines whether the fourth dynamic parameter reaches a fourth preset threshold, uses an updated new key as a key used in S909 under the condition that the fourth dynamic parameter reaches the fourth preset threshold, and still uses the current key as the key used in S909 under the condition that the fourth dynamic parameter does not reach the fourth preset threshold.

For example, the third preset threshold may be $0.9 \times 2^{n-k}$, whether $SN_2 \% 2^{n-k}$ reaches 90% of $2^{n-k}$ is determined, and if so, the updating operation for the key is started. Optionally, when the updating operation for the key is started, an updating operation for the differentiation parameter C may further be started. For example, the fourth preset threshold may be $2^{n-k}-1$, and whether $SN_2 \% 2^{n-k}$ reaches $2^{n-k}-1$ is determined. The third preset threshold is less than the fourth preset threshold, and the fourth preset threshold is not greater than a maximum value of lower-order n-k bits of $IV_2$. Optionally, $IV_2$ may further be calculated in S908 according to a new differentiation parameter C when the updated new key is used as the key used in S909.

S908, the node 2 multiplies the fourth dynamic parameter by the coefficient P, and then sums a product of the fourth dynamic parameter and the coefficient P, the differentiation parameter C and $Q_2$ to calculate $IV_2$.

M represents a maximum value $2^{n-k}$ of n-k lower-order bits of $IV_2$ when $IV_2$ overflows firstly. For example, if an increment value is 1, the node 2 adds 1 to the $SN_2$ value, takes P=2 and $Q_2$=−1, and calculates $IV_2$ according to $IV_2 = C + SN_2 \% 2^{n-k} \times 2 - 1$.

S909, the node 2 encrypts a second data packet according to the calculated $IV_2$ and the Key, encapsulates an encrypted second data packet according to an encapsulation protocol, and then sends the encapsulated second data packet to the node 1.

The node 2 encrypts, by using $IV_2$ and the Key as two input parameters of an encryption algorithm, $DATA_{2to1}$ by using the symmetric encryption algorithm, i.e., $(DATA_{2to1})_{ciphertext} = FUN_{encrypt}(IV_2, Key, DATA_{2to1})$, then encapsulates $(DATA_{2to1})_{ciphertext}$ according to the encapsulation protocol, and sends encapsulated $(DATA_{2to1})_{ciphertext}$ to the node 1 after completion.

It should be noted that after sending the encrypted second data packet to the node 1, the node 2 may execute relevant steps anew from S906 to calculate a new $IV_2$, and encrypts a data packet subsequently sent to the node 1 by using the calculated $IV_2$ and the key. After the node 2 sends a plurality of encrypted data packets to the node 1, if the $SN_2$ value of the node 2 overflows, the node 2 initializes the $SN_2$ value, and then executes relevant steps from S906.

S910, the node 1 acquires an $SN_2$ value in the received encapsulated second data packet, divides the $SN_2$ value by M for complementation to obtain the fourth dynamic parameter, multiplies the fourth dynamic parameter by the coefficient P, and sums a product of the fourth dynamic parameter and the coefficient P, the differentiation parameter C and $Q_2$ to calculate $IV_2$, and decrypts the encrypted second data packet according to $IV_2$ and the Key.

When receiving communication traffic of the node 2, the node 1 acquires the $SN_2$ value in an encapsulated message, calculates $IV_2$ by using $IV_2=C+SN_2\%2^{n-k}\times 2-1$, and decrypts, by using $IV_2$ and the Key as two input parameters of the encryption algorithm, $(DATA_{2to1})_{ciphertext}$ by using the symmetric encryption algorithm, i.e., $(DATA_{2to1})_{plaintext}=FUN_{decipher}(IV_2,$ Key, $(DATA_{2to1})_{ciphertext})$.

Figure 10:
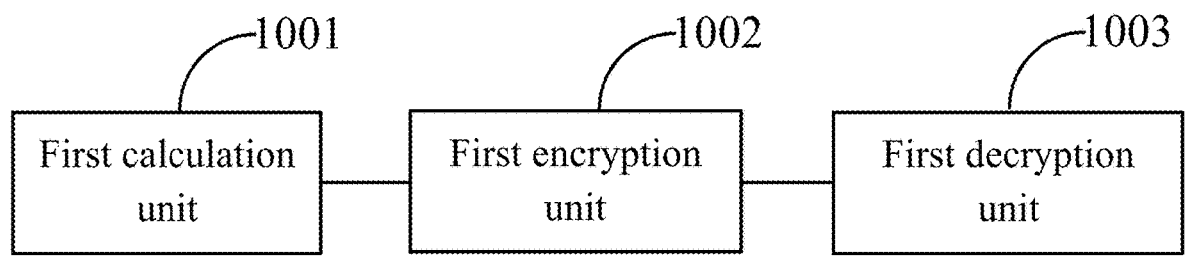
FIG. 10 is a schematic diagram of an apparatus for data secure transmission according to an embodiment of the present application.

As shown in FIG. 10, a schematic diagram of an apparatus for data secure transmission is provided in an embodiment of the present application. The apparatus includes: a first calculation unit 1001, configured to incrementally update a serial number $SN_1$ value initialized by the apparatus, and perform first mathematical transformation on an updated $SN_1$ value to calculate a first initialization vector $IV_1$; a first encryption unit 1002, configured to encrypt a first data packet according to the calculated $IV_1$ and a key, and then send an encrypted first data packet to a node 2; and a first decryption unit 1003, configured to acquire an $SN_2$ value in a received second data packet, perform second mathematical transformation on the acquired $SN_2$ value to calculate a second initialization vector $IV_2$, and decrypt an encrypted second data packet according to the calculated $IV_2$ and the key, where the first mathematical transformation and the second mathematical transformation cause the calculated $IV_1$ to be unequal to the calculated $IV_2$.

Optionally, before calculating the first initialization vector $IV_1$, the first calculation unit 1001 is further configured to: determine an overflow sequence of $SN_1$ and $IV_1$; perform the first mathematical transformation on the updated $SN_1$ value to calculate $IV_1$ when it is determined that $SN_1$ overflows firstly as follows: setting the $SN_1$ value configured to calculate $IV_1$ as a first dynamic parameter, multiply the first dynamic parameter by a coefficient P, and then summing a product of the first dynamic parameter and the coefficient P, a differentiation parameter C and a first parameter $Q_1$ to calculate $IV_1$; and perform the first mathematical transformation on the updated $SN_1$ value to calculate $IV_1$ when it is determined that $IV_1$ overflows firstly as follows: dividing the $SN_1$ value configured to calculate $IV_1$ by M for complementation to obtain a third dynamic parameter, multiply the third dynamic parameter by the coefficient P, and then summing a product of the third dynamic parameter and the coefficient P, the differentiation parameter C and $Q_1$ to calculate $IV_1$, where P is unequal to 1 and 0, and $Q_1$ is 0 or is not an integer multiple of P; and a length of C is equal to a length n of $IV_1$, C includes higher-order bits of k bits and lower-order bits of n–k bits, a value of the lower-order bits is zero, and M is a maximum value $2^{n-k}$ of lower-order n–k bits of $IV_1$ when $IV_1$ overflows firstly.

Optionally, the first calculation unit 1001 determines the overflow sequence of $SN_1$ and $IV_1$ as follows: calculating a difference between the length n of $IV_1$ and a length k of the higher-order bits; determining $SN_1$ to overflow firstly under the condition that a length m of $SN_1$ is not greater than the difference; and determining $IV_1$ to overflow firstly under the condition that the length m of $SN_1$ is greater than the difference.

Optionally, before calculating the second initialization vector $IV_2$, the first decryption unit 1003 is further configured to: determine an overflow sequence of $SN_2$ and $IV_2$; perform the second mathematical transformation on the acquired $SN_2$ value to calculate $IV_2$ when it is determined that $SN_2$ overflows firstly as follows: setting the $SN_2$ value configured to calculate $IV_2$ as a second dynamic parameter, multiply the second dynamic parameter by the coefficient P, and then summing a product of the second dynamic parameter and the coefficient P, the differentiation parameter C and a second parameter $Q_2$ to calculate $IV_2$; and perform the second mathematical transformation on the acquired $SN_2$ value to calculate $IV_2$ when it is determined that $IV_2$ overflows firstly as follows: dividing the $SN_2$ value configured to calculate $IV_2$ by M for complementation to obtain a fourth dynamic parameter, multiply the fourth dynamic parameter by the coefficient P, and then summing a product of the fourth dynamic parameter and the coefficient P, the differentiation parameter C and $Q_2$ to calculate $IV_2$, where $Q_2$ is 0 or is not an integer multiple of P, and is different from $Q_1$; and a length of C is equal to a length n of $IV_2$, and M is a maximum value $2^{n-k}$ of lower-order n–k bits of $IV_2$ when $IV_2$ overflows firstly.

Optionally, the first decryption unit 1003 determines the overflow sequence of $SN_2$ and $IV_2$ as follows: calculating a difference between the length n of $IV_2$ and a length k of the higher-order bits; determining $SN_2$ to overflow firstly under the condition that a length m of $SN_2$ is not greater than the difference; and determining $IV_2$ to overflow firstly under the condition that the length m of $SN_2$ is greater than the difference.

Optionally, before calculating the first initialization vector $IV_1$, the first calculation unit 1001 is further configured to: start an updating operation for the key when it is determined that $SN_1$ overflows firstly and the first dynamic parameter reaches a first preset threshold, and use an updated new key as a key used during data sending when the first dynamic parameter reaches a second preset threshold, where the first preset threshold is less than the second preset threshold, and the second preset threshold is not greater than a maximum value of $SN_1$; and start an updating operation for the key when it is determined that $IV_1$ overflows firstly and the third dynamic parameter reaches a third preset threshold, and use an updated new key as a key used during data sending when the third dynamic parameter reaches a fourth preset threshold, where the third preset threshold is less than the fourth preset threshold, and the fourth preset threshold is not greater than a maximum value of lower-order n–k bits of $IV_1$.

Optionally, before calculating the second initialization vector $IV_2$, the first decryption unit 1003 is further configured to: start an updating operation for the key when it is determined that $SN_2$ overflows firstly and the second dynamic parameter reaches a first preset threshold, and use an updated new key as a key used during data sending when the second dynamic parameter reaches a second preset threshold, where the first preset threshold is less than the second preset threshold, and the second preset threshold is not greater than a maximum value of $SN_2$; and start an updating operation for the key when it is determined that $IV_2$ overflows firstly and the fourth dynamic parameter reaches a third preset threshold, and use an updated new key as a key used during data sending when the fourth dynamic parameter reaches a fourth preset threshold, where the third preset threshold is less than the fourth preset threshold, and the fourth preset threshold is not greater than a maximum value of lower-order n–k bits of $IV_2$.

Optionally, when starting the updating operation for the key, the first calculation unit 1001/first decryption unit 1003 is further configured to: start a calculation operation of a new value of a number k of bits of the higher-order bits to generate a new differentiation parameter C; or, start a calculation operation of a new value N of the higher-order bits of the k bits to generate a new differentiation parameter C.

Optionally, when using the updated new key as a key used during data sending, the first calculation unit 1001/first decryption unit 1003 is further configured to: calculate an initialization vector (IV) used during data sending according to the new differentiation parameter C.

Optionally, P is set as 2, $Q_1$ is set as 0, $Q_2$ is set as −1, and C is set as a random number.

Figure 11:
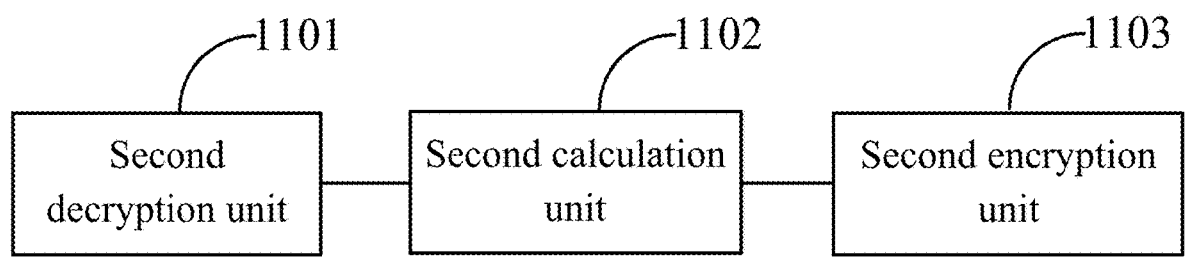
FIG. 11 is a schematic diagram of another apparatus for data secure transmission according to an embodiment of the present application.

As shown in FIG. 11, a schematic diagram of another apparatus for data secure transmission is provided in an embodiment of the present application. The apparatus includes: a second decryption unit 1101, configured to acquire an $SN_1$ value in a received first data packet, perform first mathematical transformation on the acquired $SN_1$ value to calculate a first initialization vector $IV_1$, and decrypt an encrypted first data packet according to the calculated $IV_1$ and a key; a second calculation unit 1102, configured to incrementally update a serial number $SN_2$ value initialized by the apparatus, and perform second mathematical transformation on an updated $SN_2$ value to calculate a second initialization vector $IV_2$; and a second encryption unit 1103, configured to encrypt a second data packet according to the calculated $IV_2$ and the key, and then send an encrypted second data packet to a node 1, where the first mathematical transformation and the second mathematical transformation cause the calculated $IV_1$ to be unequal to the calculated $IV_2$.

Optionally, before calculating the first initialization vector $IV_1$, the second decryption unit 1101 is further configured to: determine an overflow sequence of $SN_1$ and $IV_1$; perform the first mathematical transformation on the acquired $SN_1$ value to calculate $IV_1$ when it is determined that $SN_1$ overflows firstly as follows: setting the $SN_1$ value configured to calculate $IV_1$ as a first dynamic parameter, multiply the first dynamic parameter by a coefficient P, and then summing a product of the first dynamic parameter and the coefficient P, a differentiation parameter C and a first parameter $Q_1$ to calculate $IV_1$; and perform the first mathematical transformation on the acquired $SN_1$ value to calculate $IV_1$ when it is determined that $IV_1$ overflows firstly as follows: dividing the $SN_1$ value configured to calculate $IV_1$ by M for complementation to obtain a third dynamic parameter, multiply the third dynamic parameter by the coefficient P, and then summing a product of the third dynamic parameter and the coefficient P, the differentiation parameter C and $Q_1$ to calculate $IV_1$, where P is unequal to 1 and 0, and $Q_1$ is 0 or is not an integer multiple of P; and a length of C is equal to a length n of $IV_1$, C includes higher-order bits of k bits and lower-order bits of n−k bits, a value of the lower-order bits is zero, and M is a maximum value $2^{n-k}$ of lower-order n−k bits of $IV_1$ when $IV_1$ overflows firstly.

Optionally, the second decryption unit 1101 determines the overflow sequence of $SN_1$ and $IV_1$ as follows: calculating a difference between the length n of $IV_1$ and a length k of the higher-order bits; determining $SN_1$ to overflow firstly under the condition that a length m of $SN_1$ is not greater than the difference; and determining $IV_1$ to overflow firstly under the condition that the length m of $SN_1$ is greater than the difference.

Optionally, before calculating the second initialization vector $IV_2$, the second calculation unit 1102 is further configured to: determine an overflow sequence of $SN_2$ and $IV_2$; perform the second mathematical transformation on the updated $SN_2$ value to calculate $SN_2$ when it is determined that $SN_2$ overflows firstly as follows: setting the $SN_2$ value configured to calculate $IV_2$ as a second dynamic parameter, multiply the second dynamic parameter by the coefficient P, and then summing a product of the second dynamic parameter and the coefficient P, the differentiation parameter C and a second parameter $Q_2$ to calculate $IV_2$; and perform the second mathematical transformation on the updated $SN_2$ value to calculate $IV_2$ when it is determined that $IV_2$ overflows firstly as follows: dividing the $SN_2$ value configured to calculate $IV_2$ by M for complementation to obtain a fourth dynamic parameter, multiply the fourth dynamic parameter by the coefficient P, and then summing a product of the fourth dynamic parameter and the coefficient P, the differentiation parameter C and $Q_2$ to calculate $IV_2$, where $Q_2$ is 0 or is not an integer multiple of P, and is different from $Q_1$; and a length of C is equal to a length n of $IV_2$, and M is a maximum value $2^{n-k}$ of lower-order n−k bits of $IV_2$ when $IV_2$ overflows firstly.

Optionally, the second calculation unit 1102 determines the overflow sequence of $SN_2$ and $IV_2$ as follows: calculating a difference between the length n of $IV_2$ and a length k of the higher-order bits; determining $SN_2$ to overflow firstly under the condition that a length m of $SN_2$ is not greater than the difference; and determining $IV_2$ to overflow firstly under the condition that the length m of $SN_2$ is greater than the difference.

Optionally, before calculating the first initialization vector $IV_1$, the second decryption unit 1101 is further configured to: start an updating operation for the key when it is determined that $SN_1$ overflows firstly and the first dynamic parameter reaches a first preset threshold, and use an updated new key as a key used during data sending when the first dynamic parameter reaches a second preset threshold, where the first preset threshold is less than the second preset threshold, and the second preset threshold is not greater than a maximum value of $SN_1$; and start an updating operation for the key when it is determined that $IV_1$ overflows firstly and the third dynamic parameter reaches a third preset threshold, and use an updated new key as a key used during data sending when the third dynamic parameter reaches a fourth preset threshold, where the third preset threshold is less than the fourth preset threshold, and the fourth preset threshold is not greater than a maximum value of lower-order n−k bits of $IV_1$.

Optionally, before calculating the second initialization vector $IV_2$, the second calculation unit 1102 is further configured to: start an updating operation for the key when it is determined that $SN_2$ overflows firstly and the second dynamic parameter reaches a first preset threshold, and use an updated new key as a key used during data sending when the second dynamic parameter reaches a second preset threshold, where the first preset threshold is less than the second preset threshold, and the second preset threshold is not greater than a maximum value of $SN_2$; and start an updating operation for the key when it is determined that $IV_2$ overflows firstly and the fourth dynamic parameter reaches a third preset threshold, and use an updated new key as a key used during data sending when the fourth dynamic parameter reaches a fourth preset threshold, where the third preset threshold is less than the fourth preset threshold, and the fourth preset threshold is not greater than a maximum value of lower-order n−k bits of $IV_2$.

Optionally, when starting the updating operation for the key, the second decryption unit 1101/second calculation unit 1102 is further configured to: start a calculation operation of a new value of a number k of bits of the higher-order bits to generate a new differentiation parameter C; or, start a calculation operation of a new value N of the higher-order bits of the k bits to generate a new differentiation parameter C.

Optionally, when using the updated new key as a key used during data sending, the second decryption unit 1101/second calculation unit 1102 is further configured to: calculate an initialization vector (IV) used during data sending according to the new differentiation parameter C.

Optionally, P is set as 2, $Q_1$ is set as 0, $Q_2$ is set as −1, and C is set as a random number.

Figure 12:
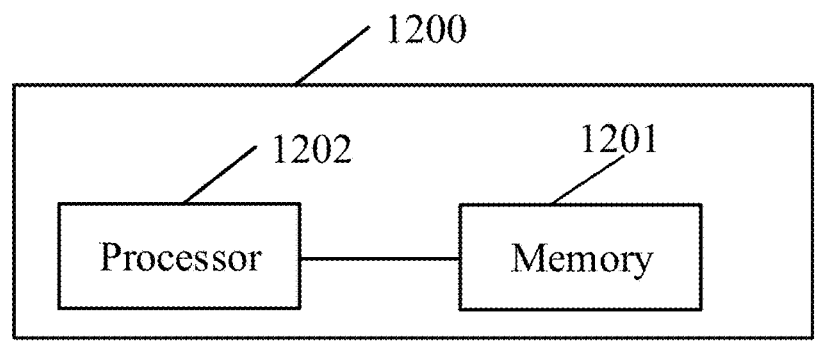
FIG. 12 is a schematic diagram of a device for data secure transmission according to an embodiment of the present application.

As shown in FIG. 12, a schematic diagram of a device 1200 for data secure transmission is provided in an embodiment of the present application. The device includes a memory 1201 and a processor 1202, where the memory 1201 is configured to store a computer program; and the processor 1202 is configured to read a program in the memory 1201 and execute steps of the method for data secure transmission at a side of a node 1 or node 2 in the above embodiment.

When the processor reads the program in the memory and executes steps of the method for data secure transmission at a side of a node 1 in the above embodiment, the processor is specifically configured to: incrementally update a serial number $SN_1$ value initialized by the node 1, and perform first mathematical transformation on an updated $SN_1$ value to calculate a first initialization vector $IV_1$; encrypt a first data packet according to the calculated $IV_1$ and a key, and then send an encrypted first data packet to a node 2; acquire an $SN_2$ value in a received second data packet, perform second mathematical transformation on the acquired $SN_2$ value to calculate a second initialization vector $IV_2$, and decrypt an encrypted second data packet according to the calculated $IV_2$ and the key, where the first mathematical transformation and the second mathematical transformation cause the calculated $IV_1$ to be unequal to the calculated $IV_2$.

Optionally, before calculating the first initialization vector $IV_1$, the processor is further configured to: determine an overflow sequence of $SN_1$ and $IV_1$; perform the first mathematical transformation on the updated $SN_1$ value to calculate $IV_1$ when it is determined that $SN_1$ overflows firstly as follows: setting the $SN_1$ value configured to calculate $IV_1$ as a first dynamic parameter, multiply the first dynamic parameter by a coefficient P, and then summing a product of the first dynamic parameter and the coefficient P, a differentiation parameter C and a first parameter $Q_1$ to calculate $IV_1$; and perform the first mathematical transformation on the updated $SN_1$ value to calculate $IV_1$ when it is determined that $IV_1$ overflows firstly as follows: dividing the $SN_1$ value configured to calculate $IV_1$ by M for complementation to obtain a third dynamic parameter, multiply the third dynamic parameter by the coefficient P, and then summing a product of the third dynamic parameter and the coefficient P, the differentiation parameter C and $Q_1$ to calculate $IV_1$, where P is unequal to 1 and 0, and $Q_1$ is 0 or is not an integer multiple of P; and a length of C is equal to a length n of $IV_1$, C includes higher-order bits of k bits and lower-order bits of n−k bits, a value of the lower-order bits is zero, and M is a maximum value $2^{n-k}$ of lower-order n−k bits of $IV_1$ when $IV_1$ overflows firstly.

Optionally, the processor determines the overflow sequence of $SN_1$ and $IV_1$ as follows: calculating a difference between the length n of $IV_1$ and a length k of the higher-order bits; determining $SN_1$ to overflow firstly under the condition that a length m of $SN_1$ is not greater than the difference; and determining $IV_1$ to overflow firstly under the condition that the length m of $SN_1$ is greater than the difference.

Optionally, before calculating the second initialization vector $IV_2$, the processor is further configured to: determine an overflow sequence of $SN_2$ and $IV_2$; perform the second mathematical transformation on the acquired $SN_2$ value to calculate $IV_2$ when it is determined that $SN_2$ overflows firstly as follows: setting the $SN_2$ value configured to calculate $IV_2$ as a second dynamic parameter, multiply the second dynamic parameter by the coefficient P, and then summing a product of the second dynamic parameter and the coefficient P, the differentiation parameter C and a second parameter $Q_2$ to calculate $IV_2$; and perform the second mathematical transformation on the acquired $SN_2$ value to calculate $IV_2$ when it is determined that $IV_2$ overflows firstly as follows: dividing the $SN_2$ value configured to calculate $IV_2$ by M for complementation to obtain a fourth dynamic parameter, multiply the fourth dynamic parameter by the coefficient P, and then summing a product of the fourth dynamic parameter and the coefficient P, the differentiation parameter C and $Q_2$ to calculate $IV_2$, where $Q_2$ is 0 or is not an integer multiple of P, and is different from $Q_1$; and a length of C is equal to a length n of $IV_2$, and M is a maximum value $2^{n-k}$ of lower-order n−k bits of $IV_2$ when $IV_2$ overflows firstly.

Optionally, the processor determines the overflow sequence of $SN_2$ and $IV_2$ as follows: calculating a difference between the length n of $IV_2$ and a length k of the higher-order bits; determining $SN_2$ to overflow firstly under the condition that a length m of $SN_2$ is not greater than the difference; and determining $IV_2$ to overflow firstly under the condition that the length m of $SN_2$ is greater than the difference.

Before calculating the first initialization vector $IV_1$, the processor is further configured to: start an updating operation for the key when it is determined that $SN_1$ overflows firstly and the first dynamic parameter reaches a first preset threshold, and use an updated new key as a key used during data sending when the first dynamic parameter reaches a second preset threshold, where the first preset threshold is less than the second preset threshold, and the second preset threshold is not greater than a maximum value of $SN_1$; and start an updating operation for the key when it is determined that $IV_1$ overflows firstly and the third dynamic parameter reaches a third preset threshold, and use an updated new key as a key used during data sending when the third dynamic parameter reaches a fourth preset threshold, where the third preset threshold is less than the fourth preset threshold, and the fourth preset threshold is not greater than a maximum value of lower-order n−k bits of $IV_1$.

Optionally, before calculating the second initialization vector $IV_2$, the processor is further configured to: start an updating operation for the key when it is determined that $SN_2$ overflows firstly and the second dynamic parameter reaches a first preset threshold, and use an updated new key as a key used during data sending when the second dynamic parameter reaches a second preset threshold, where the first preset threshold is less than the second preset threshold, and the second preset threshold is not greater than a maximum value of $SN_2$; and start an updating operation for the key when it is determined that $IV_2$ overflows firstly and the fourth dynamic parameter reaches a third preset threshold, and use an updated new key as a key used during data sending when the fourth dynamic parameter reaches a fourth preset threshold, where the third preset threshold is less than the fourth preset threshold, and the fourth preset threshold is not greater than a maximum value of lower-order n−k bits of $IV_2$.

Optionally, when starting the updating operation for the key, the processor is further configured to: start a calculation operation of a new value of a number k of bits of the higher-order bits to generate a new differentiation parameter C; or, start a calculation operation of a new value N of the higher-order bits of the k bits to generate a new differentiation parameter C.

Optionally, when using the updated new key as a key used during data sending, the processor is further configured to: calculate an initialization vector (IV) used during data sending according to the new differentiation parameter C.

Optionally, P is set as 2, $Q_1$ is set as 0, $Q_2$ is set as −1, and C is set as a random number.

When the processor reads the program in the memory and executes steps of the method for data secure transmission at a side of a node 2 in the above embodiment, the processor is specifically configured to: acquire an $SN_1$ value in a received first data packet, perform first mathematical transformation on the acquired $SN_1$ value to calculate a first initialization vector $IV_1$, and decrypt an encrypted first data packet according to the calculated $IV_1$ and a key; incrementally update a serial number $SN_2$ value initialized by the node 2, and perform second mathematical transformation on an updated $SN_2$ value to calculate a second initialization vector $IV_2$; and encrypt a second data packet according to the calculated $IV_2$ and the key, and then send an encrypted second data packet to the node 1, where the first mathematical transformation and the second mathematical transformation cause the calculated $IV_1$ to be unequal to the calculated $IV_2$.

Optionally, before calculating the first initialization vector $IV_1$, the processor is further configured to: determine an overflow sequence of $SN_1$ and $IV_1$; perform the first mathematical transformation on the acquired $SN_1$ value to calculate $IV_1$ when it is determined that $SN_1$ overflows firstly as follows: setting the $SN_1$ value configured to calculate $IV_1$ as a first dynamic parameter, multiply the first dynamic parameter by a coefficient P, and then summing a product of the first dynamic parameter and the coefficient P, a differentiation parameter C and a first parameter $Q_1$ to calculate $IV_1$; and perform the first mathematical transformation on the acquired $SN_1$ value to calculate IV when it is determined that $IV_1$ overflows firstly as follows: dividing the $SN_1$ value configured to calculate $IV_1$ by M for complementation to obtain a third dynamic parameter, multiply the third dynamic parameter by the coefficient P, and then summing a product of the third dynamic parameter and the coefficient P, the differentiation parameter C and $Q_1$ to calculate $IV_1$, where P is unequal to 1 and 0, and $Q_1$ is 0 or is not an integer multiple of P; and a length of C is equal to a length n of $IV_1$, C includes higher-order bits of k bits and lower-order bits of n−k bits, a value of the lower-order bits is zero, and M is a maximum value $2^{n-k}$ of lower-order n−k bits of $IV_1$ when $IV_1$ overflows firstly.

Optionally, the processor determines the overflow sequence of $SN_1$ and $IV_1$ as follows: calculating a difference between the length n of $IV_1$ and a length k of the higher-order bits; determining $SN_1$ to overflow firstly under the condition that a length m of $SN_1$ is not greater than the difference; and determining $IV_1$ to overflow firstly under the condition that the length m of $SN_1$ is greater than the difference.

Optionally, before calculating the second initialization vector $IV_2$, the processor is further configured to: determine an overflow sequence of $SN_2$ and $IV_2$; perform the second mathematical transformation on the updated $SN_2$ value to calculate $SN_2$ when it is determined that $SN_2$ overflows firstly as follows: setting the $SN_2$ value configured to calculate $IV_2$ as a second dynamic parameter, multiply the second dynamic parameter by the coefficient P, and then summing a product of the second dynamic parameter and the coefficient P, the differentiation parameter C and a second parameter $Q_2$ to calculate $IV_2$; and perform the second mathematical transformation on the updated $SN_2$ value to calculate $IV_2$ when it is determined that $IV_2$ overflows firstly as follows: dividing the $SN_2$ value configured to calculate $IV_2$ by M for complementation to obtain a fourth dynamic parameter, multiply the fourth dynamic parameter by the coefficient P, and then summing a product of the fourth dynamic parameter and the coefficient P, the differentiation parameter C and $Q_2$ to calculate $IV_2$, where $Q_2$ is 0 or is not an integer multiple of P, and is different from $Q_1$; and a length of C is equal to a length n of $IV_2$, and M is a maximum value $2^{n-k}$ of lower-order n−k bits of $IV_2$ when $IV_2$ overflows firstly.

Optionally, the processor determines the overflow sequence of $SN_2$ and $IV_2$ as follows: calculating a difference between the length n of $IV_2$ and a length k of the higher-order bits; determining $SN_2$ to overflow firstly under the condition that a length m of $SN_2$ is not greater than the difference; and determining $IV_2$ to overflow firstly under the condition that the length m of $SN_2$ is greater than the difference.

Optionally, before calculating the first initialization vector $IV_1$, the processor is further configured to: start an updating operation for the key when it is determined that $SN_1$ overflows firstly and the first dynamic parameter reaches a first preset threshold, and use an updated new key as a key used during data sending when the first dynamic parameter reaches a second preset threshold, where the first preset threshold is less than the second preset threshold, and the second preset threshold is not greater than a maximum value of $SN_1$; and start an updating operation for the key when it is determined that $IV_1$ overflows firstly and the third dynamic parameter reaches a third preset threshold, and use an updated new key as a key used during data sending when the third dynamic parameter reaches a fourth preset threshold, where the third preset threshold is less than the fourth preset threshold, and the fourth preset threshold is not greater than a maximum value of lower-order n−k bits of $IV_1$.

Optionally, before calculating the second initialization vector $IV_2$, the processor is further configured to: start an updating operation for the key when it is determined that $SN_2$ overflows firstly and the second dynamic parameter reaches a first preset threshold, and use an updated new key as a key used during data sending when the second dynamic parameter reaches a second preset threshold, where the first preset threshold is less than the second preset threshold, and the second preset threshold is not greater than a maximum value of $SN_2$; and start an updating operation for the key when it is determined that $IV_2$ overflows firstly and the fourth dynamic parameter reaches a third preset threshold, and use an updated new key as a key used during data sending when the fourth dynamic parameter reaches a fourth preset threshold, where the third preset threshold is less than the fourth preset threshold, and the fourth preset threshold is not greater than a maximum value of lower-order n−k bits of $IV_2$.

Optionally, when starting the updating operation for the key, the processor is further configured to: start a calculation operation of a new value of a number k of bits of the higher-order bits to generate a new differentiation parameter C; or, start a calculation operation of a new value N of the higher-order bits of the k bits to generate a new differentiation parameter C.

Optionally, when using the updated new key as a key used during data sending, the processor is further configured to: calculate an initialization vector (IV) used during data sending according to the new differentiation parameter C.

Optionally, P is set as 2, $Q_1$ is set as 0, $Q_2$ is set as −1, and C is set as a random number.

The present application further provides a computer program medium. The computer program medium stores a computer program, where when the computer program is executed by a processor, steps of a method for data secure transmission at a side of a node 1 or node 2 according to the embodiment above is implemented.

In the several embodiments according to the present application, it should be understood that the systems, apparatuses and methods disclosed can be implemented in other ways. For example, the apparatus embodiment described above is merely schematic. For example, division of the modules is merely a kind of division of logic functions, and there may be other division modes in actual implementation. For example, a plurality of modules or components can be combined or integrated into another system, or some features can be omitted or not conducted. In another aspect, the coupling or direct coupling or communicative connection to one another shown or discussed may be by means of some interfaces, and the indirect coupling or communicative connection of apparatuses or modules may be in electrical, mechanical, or other form.

The module described as a separable part may be physically separated or not, and a part shown as a module may be a physical unit or not, that is, may be located at one place or may also be distributed on a plurality of network modules. Some or all of the modules may be selected according to actual needs to achieve the purpose of the solution of the embodiment.

In addition, the functional modules in the embodiments of the present application may be integrated into the same processing module, or each module may be physically present separately, or two or more modules may be integrated into the same module. The above integrated modules may be implemented in the form of hardware, or may be implemented in the form of a software functional module. If the integrated modules are implemented in the form of software function modules and sold or used as independent products, the integrated modules may be stored in a computer-readable storage medium.

In the above embodiment, the integrated modules may be fully or partially implemented through software, hardware, firmware, or any combination of the software, the hardware and the firmware. When implemented by using software, the integrated modules may be fully or partially implemented in the form of a computer program product.

The computer program product includes one or more computer instructions. The flows or functions according to the embodiments of the present application are fully or partially generated when the computer program instructions are loaded or executed on a computer. The computer may be a general-purpose computer, a special-purpose computer, a computer network, or other programmable apparatuses. The computer instructions may be stored in a computer-readable storage medium or transmitted from one computer-readable storage medium to another computer-readable storage medium. For example, the computer instructions may be transmitted from one website, computer, server, or data center to the other website, computer, server, or data center in a wired (such as a coaxial cable, a fiber optic and a digital subscriber line (DSL)) or wireless (such as infrared, wireless and microwave) mode. The computer-readable storage medium may be any available medium that may be stored by a computer or a data storage device such as a server, a data center, etc. that includes one or more available media. The available medium may be a magnetic medium (such as a floppy disk, a hard disk and a magnetic tape), an optical medium (such as a digital video disk (DVDs)), or a semi-conductor medium (such as a solid state disk (SSD)).

The technical solutions according to the present application are introduced in detail above. Specific examples are used in the present application for illustration of the principles and implementations of the present application. The description of the above embodiments is merely used to help understand the method and its core concept of the present application. In addition, a common person skilled in the art can make modifications to the specific implementations and application scope in accordance with the concept of the present application. To sum up, the content of the description should not be construed as a limitation to the present application.

Those skilled in the art should understand that the embodiments of the present application can be provided as methods, systems, or computer program products. Therefore, the present application can use full hardware embodiments, full software embodiments, or software and hardware combined embodiments. Moreover, the present application can take the form of a computer program product implemented on one or more computer usable storage media (including, but not limited to, disk memories, compact disc read-only memories (CD-ROMs), optical memories, etc.) containing computer usable program codes.

The present application is described with reference to flowcharts and/or block diagrams of methods, devices (systems), and computer program products according to the embodiments of the present application. It should be understood that each flow and/or block in the flow charts and/or block diagrams and combinations of the flows and/or blocks in the flow charts and/or block diagrams can be implemented by computer program instructions. These computer program instructions can be provided for a general-purpose computer, a special-purpose computer, an embedded processor, or a processor of another programmable data processing terminal device to generate a machine, such that the instructions executed by the computer or the processor of another programmable data processing terminal device generate an apparatus for implementing a specific function in one or more processes in the flow charts and/or in one or more blocks in the block diagrams.

These computer program instructions can also be stored in a computer-readable memory that may instruct the computer or another programmable data processing terminal device to work in a specific manner, such that the instructions stored in the computer-readable memory generate an artifact that includes an instruction apparatus. The instruction apparatus implements a specific function in one or more flows in the flow charts and/or in one or more blocks in the block diagrams.

These computer program instructions can also be loaded onto the computer or another programmable data processing terminal device, such that a series of operation steps are executed on the computer or another programmable data processing terminal device, so as to generate computer-implemented processing. Therefore, the instructions executed on the computer or another programmable data processing terminal device provide steps for implementing a specific function in one or more flows in the flow charts and/or in one or more blocks in the block diagrams.

Apparently, those skilled in the art can make various modifications and variations to the present application without departing from the spirit and scope of the present application. In this way, if these modifications and variations of the present application fall within the scope of the claims of the present application and their equivalent technologies, the present application is also intended to cover these modifications and variations.

What is claimed is:

1. A method for data secure transmission, comprising:
   incrementally updating, by a node 1, a serial number $SN_1$ value initialized by the node 1, and performing, by the node 1, first mathematical transformation on an updated $SN_1$ value to calculate a first initialization vector $IV_1$;
   encrypting, by the node 1, a first data packet according to the calculated $IV_1$ and a key, and then-sending, by the node 1, an encrypted first data packet to a node 2;
   acquiring, by the node 2, the $SN_1$ value in the received first data packet, performing, by the node 2, the first mathematical transformation on the acquired $SN_1$ value to calculate $IV_1$, and decrypting, by the node 2, the encrypted first data packet according to the calculated $IV_1$ and the key;
   incrementally updating, by the node 2, a serial number $SN_2$ value initialized by the node 2, and performing, by the node 2, second mathematical transformation on an updated $SN_2$ value to calculate a second initialization vector $IV_2$;
   encrypting, by the node 2, a second data packet according to the calculated $IV_2$ and the key, and sending, by the node 2, an encrypted second data packet to the node 1; and
   acquiring, by the node 1, the $SN_2$ value in the received second data packet, performing, by the node 1, the second mathematical transformation on the acquired $SN_2$ value to calculate $IV_2$, and decrypting, by the node 1, the encrypted second data packet according to the calculated $IV_2$ and the key;
   wherein the first mathematical transformation and the second mathematical transformation cause the calculated $IV_1$ to be unequal to the calculated $IV_2$;
wherein before the node 1/node 2 calculates the first initialization vector $IV_1$, the method further comprises:
   determining an overflow sequence of $SN_1$ and $IV_1$;
   performing the mathematical transformation on the updated/acquired $SN_1$ value to calculate $IV_1$ when it is determined that $SN_1$ overflows before $IV_1$ as follows:
   setting the $SN_1$ value configured to calculate $IV_1$ as a first dynamic parameter, multiplying the first dynamic parameter by a coefficient P, and summing a product of the first dynamic parameter and the coefficient P, a differentiation parameter C and a first parameter $Q_1$ to calculate $IV_1$; and
   performing the first mathematical transformation on the updated/acquired $SN_1$ value to calculate $IV_1$ when it is determined that $IV_1$ overflows before $SN_1$ as follows:
   dividing the $SN_1$ value configured to calculate $IV_1$ by M for complementation to obtain a third dynamic parameter, multiplying the third dynamic parameter by the coefficient P, and summing a product of the third dynamic parameter and the coefficient P, the differentiation parameter C and $Q_1$ to calculate $IV_1$;
   wherein P is unequal to 1 and 0, and $Q_1$ is 0 or is not an integer multiple of P; and a length of C is equal to a length n of $IV_1$, C comprises higher order bits of k bits and lower-order bits of n–k bits, a value of the lower order bits is zero, and M is a maximum value $2^{n-k}$ of lower order n–k bits of $IV_1$ when $IV_1$ overflows before $SN_1$.

2. The method according to claim 1, wherein before the node 2/node 1 calculates the second initialization vector $IV_2$, the method further comprises:
   determining an overflow sequence of $SN_2$ and $IV_2$;
   performing the second mathematical transformation on the updated/acquired $SN_2$ value to calculate $IV_2$ when it is determined that $SN_2$ overflows before $IV_2$ as follows:
   setting the $SN_2$ value configured to calculate $IV_2$ as a second dynamic parameter, multiplying the second dynamic parameter by the coefficient P, and summing a product of the second dynamic parameter and the coefficient P, the differentiation parameter C and a second parameter $Q_2$ to calculate $IV_2$; and
   performing the second mathematical transformation on the updated/acquired $SN_2$ value to calculate $IV_2$ when it is determined that $IV_2$ overflows before $SN_2$ as follows:
   dividing the $SN_2$ value configured to calculate $IV_2$ by M for complementation to obtain a fourth dynamic parameter, multiplying the fourth dynamic parameter by the coefficient P, and summing a product of the fourth dynamic parameter and the coefficient P, the differentiation parameter C and $Q_2$ to calculate $IV_2$;
   wherein $Q_2$ is 0 or is not an integer multiple of P, and is different from $Q_1$; and a length of C is equal to a length n of $IV_2$, and M is a maximum value $2^{n-k}$ of lower-order n–k bits of $IV_2$ when $IV_2$ overflows before $SN_2$.

3. The method according to claim 1, wherein before the node 1/node 2 calculates the first initialization vector $IV_1$, the method further comprises:
   starting an updating operation for the key when it is determined that $SN_1$ overflows before $IV_1$ and the first dynamic parameter reaches a first preset threshold, and using an updated new key as a key used during data sending when the first dynamic parameter reaches a second preset threshold, wherein the first preset threshold is less than the second preset threshold, and the second preset threshold is not greater than a maximum value of $SN_1$; and
   starting an updating operation for the key when it is determined that $IV_1$ overflows before $SN_1$ and the third dynamic parameter reaches a third preset threshold, and using an updated new key as a key used during data sending when the third dynamic parameter reaches a fourth preset threshold, wherein the third preset threshold is less than the fourth preset threshold, and the fourth preset threshold is not greater than a maximum value of lower-order n–k bits of $IV_1$.

4. The method according to claim 2, wherein before the node 2/node 1 calculates the second initialization vector $IV_2$, the method further comprises:
   starting an updating operation for the key when it is determined that $SN_2$ overflows before $IV_2$ and the second dynamic parameter reaches a first preset threshold, and using an updated new key as a key used during data sending when the second dynamic parameter reaches a second preset threshold, wherein the first preset threshold is less than the second preset threshold, and the second preset threshold is not greater than a maximum value of $SN_2$; and starting an updating operation for the key when it is determined that $IV_2$ overflows before $SN_2$ and the fourth dynamic parameter reaches a third preset threshold, and using an updated new key as a key used during data sending when the fourth dynamic parameter reaches a fourth preset threshold, wherein the third preset threshold is less than the fourth preset threshold, and the fourth preset threshold is not greater than a maximum value of lower-order n–k bits of $IV_2$.

5. The method according to claim 3, wherein when starting the updating operation for the key, the method further comprises:
   starting a calculation operation of a new value of a number k of bits of the higher-order bits to generate a new differentiation parameter C; or, starting a calculation operation of a new value N of the higher-order bits of the k bits to generate a new differentiation parameter C.

6. The method according to claim 5, wherein when using the updated new key as the key used during data sending, the method further comprises:
   calculating an initialization vector (IV) used during data sending according to the new differentiation parameter C.

7. The method according to claim 2, wherein P is set as 2, $Q_1$ is set as 0, $Q_2$ is set as –1, and C is set as a random number.

8. An apparatus for data secure transmission, comprising a memory and a processor, wherein the memory is configured to store a computer program; and the processor is configured to read the computer program in the memory to:
   incrementally update a serial number SN; value initialized by the apparatus, and perform first mathematical transformation on an updated SN; value to calculate a first initialization vector $IV_1$;
   encrypt a first data packet according to the calculated $IV_1$ and a key, and send an encrypted first data packet to a node 2; and
   acquire an $SN_2$ value in a received second data packet, perform second mathematical transformation on the acquired $SN_2$ value to calculate a second initialization vector $IV_2$, and decrypt an encrypted second data packet according to the calculated $IV_2$ and the key;
   wherein the first mathematical transformation and the second mathematical transformation cause the calculated $IV_1$ to be unequal to the calculated $IV_2$;
wherein before calculating the first initialization vector $IV_1$, the processor is further configured to read the computer program in the memory to:
   determine an overflow sequence of $SN_1$ and $IV_1$;
   perform the first mathematical transformation on the updated $SN_1$ value to calculate $IV_1$ when it is determined that $SN_1$ overflows before $IV_1$ as follows:
   setting the $SN_1$ value configured to calculate $IV_1$ as a first dynamic parameter, multiplying the first dynamic parameter by a coefficient P, and summing a product of the first dynamic parameter and the coefficient P, a differentiation parameter C and a first parameter $Q_1$ to calculate $IV_1$; and
   perform the first mathematical transformation on the updated $SN_1$ value to calculate $IV_1$ when it is determined that $IV_1$ overflows before $SN_1$ as follows:
   dividing the $SN_1$ value configured to calculate $IV_1$ by M for complementation to obtain a third dynamic parameter, multiplying the third dynamic parameter by the coefficient P, and summing a product of the third dynamic parameter and the coefficient P, the differentiation parameter C and $Q_1$ to calculate $IV_1$;
   wherein P is unequal to 1 and 0, and $Q_1$ is 0 or is not an integer multiple of P; and a length of C is equal to a length n of $IV_1$, C comprises higher order bits of k bits and lower-order bits of n–k bits, a value of the lower order bits is zero, and M is a maximum value $2^{n-k}$ of lower order n–k bits of $IV_1$ when $IV_1$ overflows before $SN_1$.

9. The apparatus according to claim 8, wherein before calculating the second initialization vector $IV_2$, the processor is further configured to read the computer program in the memory to:
   determine an overflow sequence of $SN_2$ and $IV_2$;
   perform the second mathematical transformation on the acquired $SN_2$ value to calculate $IV_2$ when it is determined that $SN_2$ overflows before $IV_2$ as follows:
   setting the $SN_2$ value configured to calculate $IV_2$ as a second dynamic parameter, multiplying the second dynamic parameter by the coefficient P, and summing a product of the second dynamic parameter and the coefficient P, the differentiation parameter C and a second parameter $Q_2$ to calculate $IV_2$; and
   perform the second mathematical transformation on the acquired $SN_2$ value to calculate $IV_2$ when it is determined that $IV_2$ overflows before $SN_2$ as follows:
   dividing the $SN_2$ value configured to calculate $IV_2$ by M for complementation to obtain a fourth dynamic parameter, multiplying the fourth dynamic parameter by the coefficient P, and summing a product of the fourth dynamic parameter and the coefficient P, the differentiation parameter C and $Q_2$ to calculate $IV_2$;
   wherein $Q_2$ is 0 or is not an integer multiple of P, and is different from $Q_1$; and a length of C is equal to a length n of $IV_2$, and M is a maximum value $2^{n-k}$ of lower-order n–k bits of $IV_2$ when $IV_2$ overflows before $SN_2$.

10. The apparatus according to claim 8, wherein before calculating the first initialization vector $IV_1$, the processor is further configured to read the computer program in the memory to:
   start an updating operation for the key when it is determined that SN; overflows before $IV_1$ and the first dynamic parameter reaches a first preset threshold, and use an updated new key as a key used during data sending when the first dynamic parameter reaches a second preset threshold, wherein the first preset threshold is less than the second preset threshold, and the second preset threshold is not greater than a maximum value of $SN_1$; and
   start an updating operation for the key when it is determined that IV; overflows before $SN_1$, and the third dynamic parameter reaches a third preset threshold, and use an updated new key as a key used during data sending when the third dynamic parameter reaches a fourth preset threshold, wherein the third preset threshold is less than the fourth preset threshold, and the fourth preset threshold is not greater than a maximum value of lower-order n–k bits of $IV_1$.

11. The apparatus according to claim 9, wherein before calculating the second initialization vector $IV_2$, the processor is further configured to read the computer program in the memory to:
   start an updating operation for the key when it is determined that SN; overflows before $IV_2$ and the second dynamic parameter reaches a first preset threshold, and use an updated new key as a key used during data sending when the second dynamic parameter reaches a second preset threshold, wherein the first preset threshold is less than the second preset threshold, and the second preset threshold is not greater than a maximum value of $SN_2$; and start an updating operation for the key when it is determined that $IV_2$ overflows before $SN_2$ and the fourth dynamic parameter reaches a third preset threshold, and use an updated new key as a key used during data sending when the fourth dynamic parameter reaches a fourth preset threshold, wherein the third preset threshold is less than the fourth preset threshold, and the fourth preset threshold is not greater than a maximum value of lower-order n−k bits of $IV_2$.

12. The apparatus according to claim 10, wherein when starting the updating operation for the key, the processor is further configured to read the computer program in the memory to:

start a calculation operation of a new value of a number k of bits of the higher order bits to generate a new differentiation parameter C; or, start a calculation operation of a new value N of the higher order bits of the k bits to generate a new differentiation parameter C.

13. The apparatus according to claim 12, wherein when using an updated new key as a key used during data sending, the processor is further configured to read the computer program in the memory to:

calculate an initialization vector (IV) used during data sending according to the new differentiation parameter C.

14. The apparatus according to claim 9, wherein P is set as 2, $Q_1$ is set as 0, $Q_2$ is set as −1, and C is set as a random number.

15. An apparatus for data secure transmission, comprising a memory and a processor, wherein the memory is configured to store a computer program; and the processor is configured to read the computer program in the memory to:

acquire an $SN_1$ value in a received first data packet, perform first mathematical transformation on the acquired $SN_1$ value to calculate a first initialization vector $IV_1$, and decrypt an encrypted first data packet according to the calculated $IV_1$ and a key;

incrementally update a serial number $SN_2$ value initialized by the apparatus, and perform second mathematical transformation on an updated $SN_2$ value to calculate a second initialization vector $IV_2$; and encrypt a second data packet according to the calculated $IV_2$ and the key, and send an encrypted second data packet to a node 1;

wherein the first mathematical transformation and the second mathematical transformation cause the calculated $IV_1$ to be unequal to the calculated $IV_2$;

wherein before calculating the first initialization vector $IV_1$, the processor is further configured to read the computer program in the memory to:

determine an overflow sequence of $SN_1$ and $IV_1$;

perform the first mathematical transformation on the updated $SN_1$ value to calculate $IV_1$ when it is determined that $SN_1$ overflows before $IV_1$ as follows:

setting the $SN_1$ value configured to calculate $IV_1$ as a first dynamic parameter, multiplying the first dynamic parameter by a coefficient P, and summing a product of the first dynamic parameter and the coefficient P, a differentiation parameter C and a first parameter $Q_1$ to calculate $IV_1$; and perform the first mathematical transformation on the updated $SN_1$ value to calculate $IV_1$ when it is determined that $IV_1$ overflows before $SN_1$ as follows:

dividing the $SN_1$ value configured to calculate $IV_1$ by M for complementation to obtain a third dynamic parameter, multiplying the third dynamic parameter by the coefficient P, and summing a product of the third dynamic parameter and the coefficient P, the differentiation parameter C and $Q_1$ to calculate $IV_1$;

wherein P is unequal to 1 and 0, and $Q_1$ is 0 or is not an integer multiple of P; and a length of C is equal to a length n of $IV_1$, C comprises higher order bits of k bits and lower-order bits of n−k bits, a value of the lower order bits is zero, and M is a maximum value $2^{n-k}$ of lower order n−k bits of $IV_1$ when $IV_1$ overflows before $SN_1$.

16. The method according to claim 4, wherein when starting the updating operation for the key, the method further comprises:

starting a calculation operation of a new value of a number k of bits of the higher-order bits to generate a new differentiation parameter C; or, starting a calculation operation of a new value N of the higher-order bits of the k bits to generate a new differentiation parameter C.

17. The apparatus according to claim 11, wherein when starting the updating operation for the key, the processor is further configured to read the computer programs in the memory to:

start a calculation operation of a new value of a number k of bits of the higher-order bits to generate a new differentiation parameter C; or, start a calculation operation of a new value N of the higher-order bits of the k bits to generate a new differentiation parameter C.

* * * * *